United States Patent
Memon et al.

(10) Patent No.: US 11,960,452 B2
(45) Date of Patent: Apr. 16, 2024

(54) INDEPENDENT ENCODING AND TRANSFORMATION OF RELATED DATA REPLICAS AND LOCALIZED BACKGROUND DATA MANAGEMENT IN A DISTRIBUTED FILE SYSTEM

(71) Applicant: NUTANIX, INC., San Jose, CA (US)

(72) Inventors: Tabrez Parvez Memon, Campbell, CA (US); Harshit Agarwal, Newark, CA (US); Amod Vilas Jaltade, San Jose, CA (US); Sreejith Mohanan, San Jose, CA (US)

(73) Assignee: NUTANIX, INC., San Jose, CA (US)

( * ) Notice: Subject to any disclaimer, the term of this patent is extended or adjusted under 35 U.S.C. 154(b) by 0 days.

(21) Appl. No.: 17/514,734

(22) Filed: Oct. 29, 2021

(65) Prior Publication Data
US 2022/0414061 A1 Dec. 29, 2022

Related U.S. Application Data

(60) Provisional application No. 63/214,215, filed on Jun. 23, 2021.

(51) Int. Cl.
| | |
|---|---|
| G06F 16/17 | (2019.01) |
| G06F 16/11 | (2019.01) |
| G06F 16/178 | (2019.01) |
| G06F 16/182 | (2019.01) |

(52) U.S. Cl.
CPC .......... *G06F 16/178* (2019.01); *G06F 16/116* (2019.01); *G06F 16/182* (2019.01)

(58) Field of Classification Search
CPC ..... G06F 16/178; G06F 16/116; G06F 16/182
USPC .......................................................... 707/626
See application file for complete search history.

(56) References Cited

U.S. PATENT DOCUMENTS

| | | | |
|---|---|---|---|
| 8,549,518 B1 | 10/2013 | Aron et al. | |
| 8,601,473 B1 | 12/2013 | Aron et al. | |
| 8,850,130 B1 | 9/2014 | Aron et al. | |
| 8,863,124 B1 | 10/2014 | Aron | |
| 9,009,106 B1 | 4/2015 | Aron et al. | |
| 9,069,708 B2 | 6/2015 | Gill et al. | |
| 9,223,843 B1 * | 12/2015 | Madhavarapu | G06F 16/2365 |

(Continued)

FOREIGN PATENT DOCUMENTS

EP 3127000 A1 7/2019

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown); pp. all.

(Continued)

*Primary Examiner* — Hicham Skhoun
(74) *Attorney, Agent, or Firm* — Artegis Law Group, LLP

(57) ABSTRACT

Various embodiments set forth techniques for maintaining replicas of a data set. The techniques include storing, by a first node, a first replica of the data set on the first node; storing, by a second node, a second replica of the data set on the second node; and performing, by the first node and based on first metadata associated with the first replica, a first data management activity on the first replica that changes a first format of the first replica so that the first format of the first replica is different from a second format of the second replica.

34 Claims, 10 Drawing Sheets

(56) References Cited

U.S. PATENT DOCUMENTS

| | | | |
|---|---|---|---|
| 9,336,132 | B1 | 5/2016 | Aron et al. |
| 9,652,265 | B1* | 5/2017 | Narayanasamy ..... G06F 13/102 |
| 9,720,921 | B1* | 8/2017 | Bhattacharyya ...... G06F 9/4806 |
| 9,747,287 | B1 | 8/2017 | Bhardwaj et al. |
| 9,772,866 | B1 | 9/2017 | Aron et al. |
| 9,971,823 | B2 | 5/2018 | Vasanth et al. |
| 10,095,418 | B1* | 10/2018 | Gong ..................... G06F 3/061 |
| 10,726,042 | B2 | 7/2020 | Chandra et al. |
| 10,929,040 | B1* | 2/2021 | Trachtman .............. G06F 3/065 |
| 11,789,950 | B1* | 10/2023 | Bernier ................. G06F 16/254 707/769 |
| 2011/0264843 | A1 | 10/2011 | Haines .................. G06F 3/0679 711/170 |
| 2014/0059310 | A1* | 2/2014 | Du ...................... G06F 9/45558 711/162 |
| 2014/0188819 | A1* | 7/2014 | Bagal .................. G06F 16/1744 707/692 |
| 2015/0006475 | A1* | 1/2015 | Guo .................... G06F 16/1752 707/693 |
| 2015/0193170 | A1* | 7/2015 | Sundaram ............. G06F 3/0608 711/103 |
| 2016/0371190 | A1* | 12/2016 | Romanovskiy ....... G06F 3/0659 |
| 2017/0060772 | A1* | 3/2017 | Krishnappa ......... G06F 12/0802 |
| 2017/0083539 | A1* | 3/2017 | Saxena ................ G06F 11/1469 |
| 2017/0185330 | A1* | 6/2017 | Danilov .............. H04L 67/1097 |
| 2020/0034449 | A1* | 1/2020 | Gupta ................. G06F 16/1748 |
| 2020/0117362 | A1* | 4/2020 | McCarthy ............. G06F 3/0623 |
| 2020/0233833 | A1 | 7/2020 | Zhu et al. |
| 2021/0117121 | A1* | 4/2021 | Chen ..................... G06F 3/0649 |
| 2021/0373768 | A1* | 12/2021 | Padala .................... H04L 69/04 |
| 2022/0092022 | A1* | 3/2022 | Agarwal ............... G06F 16/113 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown); pp. all.

Poitras, Steven. "The Nutanix Bible" (Jun. 20, 2014), from http://stevenpoitras.com/the-nutanix-bible/ (Publication date based on indicated capture date by Archive.org; first publication date unknown); pp. all.

Poitras, Steven. "The Nutanix Bible" (Jan. 7, 2015), from http://stevenpoitras.com/the-nutanix-bible/ (Publication date based on indicated capture date by Archive.org; first publication date unknown); pp. all.

Poitras, Steven. "The Nutanix Bible" (Jun. 9, 2015), from http://stevenpoitras.com/the-nutanix-bible/ (Publication date based on indicated capture date by Archive.org; first publication date unknown); pp. all.

Poitras, Steven. "The Nutanix Bible" (Sep. 4, 2015), from https://nutanixbible.com/; pp. all.

Poitras, Steven. "The Nutanix Bible" (Jan. 12, 2016), from https://nutanixbible.com/ ; pp. all.

Poitras, Steven. "The Nutanix Bible" (Jun. 9, 2016), from https://nutanixbible.com/; pp. all.

Poitras, Steven. "The Nutanix Bible" (Jan. 3, 2017), from https://nutanixbible.com/; pp. all.

Poitras, Steven. "The Nutanix Bible" (Jun. 8, 2017), from https://nutanixbible.com/; pp. all.

Poitras, Steven. "The Nutanix Bible" (Jan. 3, 2018), from https://nutanixbible.com/; pp. all.

Poitras, Steven. "The Nutanix Bible" (Jun. 25, 2018), from https://nutanixbible.com/; pp. all.

Poitras, Steven. "The Nutanix Bible" (Jan. 8, 2019), from https://nutanixbible.com/; pp. all.

Poitras, Steven. "The Nutanix Bible" (Jul. 25, 2019), from https://nutanixbible.com/; pp. all.

Poitras, Steven. "The Nutanix Bible" (Sep. 17, 2019), from https://nutanixbible.com/; pp. all.

Cano, Ignacio et al. "Curator: Self-Managing Storage for Enterprise Clusters"; University of Washington; published Mar. 2017; pp. all.

Poitras, Steven. "The Nutanix Bible" (Mar. 2, 2020), from https://nutanixbible.com/; pp. all.

Poitras, Steven. "The Nutanix Bible" (Sep. 1, 2020), from https://nutanixbible.com/; pp. all.

MongoDB, Inc., MongoDB Clusters, 2021, 10 pages.

Hadoop Distributed File System, 7 pages.

Wang et al., Gnothi: Separating Data and Metadata for Efficient and Available Storage Replication, The University at Austin, 2012, 12 pages.

Google, FlatBuffers, 4 pages, available at https://google.github.io/flatbuffers/.

* cited by examiner

INDEPENDENT ENCODING AND TRANSFORMATION OF RELATED DATA REPLICAS AND LOCALIZED BACKGROUND DATA MANAGEMENT IN A DISTRIBUTED FILE SYSTEM

CROSS-REFERENCE TO RELATED APPLICATIONS

This application claims priority benefit of the U.S. Provisional Patent Application titled, "INDEPENDENT ENCODING AND TRANSFORMATION OF RELATED DATA REPLICAS AND LOCALIZED BACKGROUND DATA MANAGEMENT IN A GLOBAL WEB-SCALE DISTRIBUTED FILE SYSTEM," filed on Jun. 23, 2021, and having Ser. No. 63/214,215. The subject matter of this related application is hereby incorporated herein by reference.

TECHNICAL FIELD

The contemplated embodiments relate generally to management of storage in a computing system and, more specifically, to techniques for independent encoding and transformation of related data replicas and localized background data management in a distributed file system.

BACKGROUND

To provide redundancy and recovery of data after a failure, a storage system can use replication. In replication, a primary copy of a data block is stored on a first node in a computing system and at least one secondary copy is replicated and stored on a second node in the computing system. Thus, if the first node suffers a failure or becomes unavailable, the data block can be read from the secondary (e.g., replicated) copy from the second node. The number of replicated copies of each data block is controlled according to a replication factor (RF) that indicates how many copies of each data block are stored on different nodes. For example, when RF=2, two copies of a data block are stored on two different nodes, (e.g., the primary copy on a first node and a replica on a second node). When RF=3, three copies of a data block are stored on three different nodes (e.g., the primary copy on a first node, a first replica on a second node, and a second replica on a third node). With RF=3, if one or two nodes suffer a failure or become unavailable, the data block can be read from the third node that stores either the primary copy or a replica. Storing all of these copies on different nodes significantly increases the amount of storage used to store data blocks. With RF=2, the amount of storage doubles, and with RF=3, the amount of storage triples.

In order to save space on the different nodes, the cluster may save different data blocks in different formats. For example, data blocks may be stored in different formats based on the expected data access pattern of the data blocks. If a data block is expected to be accessed often, then the data block is referred to herein as a hot data block or a warm data block. Primary copies and secondary copies of warm data blocks and hot data blocks may be stored in uncompressed format and in a relatively high-performance, low-capacity portion of the storage system. As a result, a client device experiences a low access time when writing data to or reading data from a hot data block or warm data block. If, on the other hand, a data block is expected to be accessed less often or rarely, then the data block is referred to herein as a cold data block. Primary copies and secondary copies of cold data block may be stored in compressed format and in a relatively low-performance, high-capacity portion of the storage system. As a result, a client device experiences a high access time when writing data to or reading data from a cold data block. By storing data blocks in different formats based on expected data access patterns, warm and hot data blocks are optimized for performance while cold data blocks are optimized for low storage requirements.

One issue with this approach for storing data blocks in a storage system is that data access patterns for data blocks may change over time. A warm or hot data block that is initially stored in an uncompressed format in high-performance, low-capacity storage may subsequently experience a reduction in data accesses and become a cold data block. However, the now cold data block needlessly consumes high-performance, low-capacity storage, potentially preventing another data block from being stored in the high-performance, low-capacity storage. Similarly, a cold data block that is initially stored in a compressed format in low-performance, high-capacity storage may subsequently experience an increase in data accesses and become a warm or hot data block. However, client devices writing data to and reading data from the now warm or hot data block experience a high-access time, leading to reduced performance.

Another issue with this approach for storing data blocks in a storage system is that data access patterns may be different between the primary copy and the various secondary copies of the data block. Therefore, at least one copy of the data block may be stored in a non-optimal format and/or in storage that has a non-optimal performance and capacity, given the data access pattern for that particular copy of the data block.

Accordingly, there is need for improved techniques for managing replicated data blocks in a distributed file system.

SUMMARY

Various embodiments set forth one or more non-transitory computer-readable media storing program instructions that, when executed by one or more processors, cause the one or more processors to perform steps including storing, by a first node, a first replica of the data set on the first node; storing, by a second node, a second replica of the data set on the second node; and performing, by the first node and based on first metadata associated with the first replica, a first data management activity on the first replica that changes a first format of the first replica so that the first format of the first replica is different from a second format of the second replica.

Other embodiments include, without limitation, methods and systems that implement one or more aspects of the disclosed techniques.

At least one technical advantage of the disclosed techniques relative to the prior art is that, with the disclosed techniques, the cluster utilizes storage more efficiently while maintaining high performance. The techniques achieve savings in the storage by using data transformations, such as compression, without compromising on performance. Further, the techniques achieve improved support for configuration changes and updates for ongoing day-to-day operations of the cluster. This improved support is especially realized when working at very high scale (scale in terms of cluster size, storage capacity and workload performance). All of the background maintenance tasks that can be offloaded to a local scan further improve the efficiency of the bookkeeping that is needed to keep the cluster healthy and to reclaim and/or improve storage usage. In addition, the techniques enable and/or control parameters of how the different nodes are allowed to separately handle the encoding of the replicas. With the disclosed techniques, overall replica storage requirements for cold replicas are reduced, while maintaining high performance for hot replicas. The techniques distribute compression and data management functions among the nodes in a cluster to avoid the bottleneck of a centralized metadata store and data management function. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, can be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

In the following description, numerous specific details are set forth to provide a more thorough understanding of the various embodiments. However, it will be apparent to one of skilled in the art that the inventive concepts can be practiced without one or more of these specific details.

In various embodiments, the disclosed techniques provide for increased flexibility and efficiency for storing replicas on various nodes in a cluster. The disclosed techniques maintain replicas across multiple nodes and store physical metadata for each replica in separate metadata stores, where the metadata store that includes the physical metadata for a particular replica is co-located with the replica. Therefore, each node independently determines how to store the replica, such as whether to store the replica in uncompressed format or in one of various compressed formats, whether to store the replica without encryption or in one of various encryption formats, and/or the like. Further, each node independently updates the local metadata store to reflect the physical metadata accordingly. Additionally, each node independently processes the local metadata store to perform various background data management activities for the replicas stored on the particular node. As a result, decisions about how to store replicas and/or when to perform data management activities for those replicas are made locally by each node, resulting in greater flexibility and efficiency relative to a system with a single global metadata store.

Independent Encoding and Transformation of Data Replicas

Figure 1:
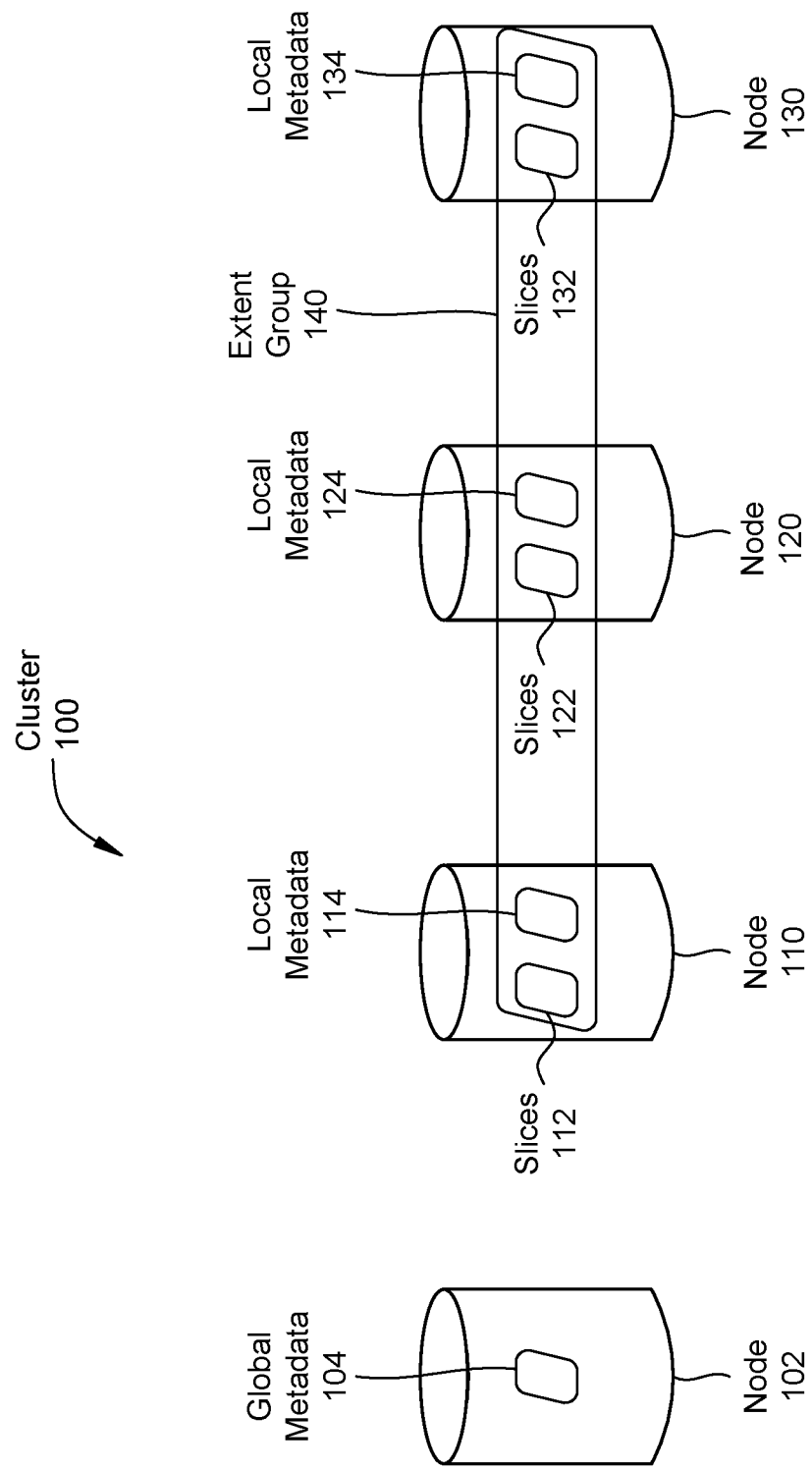
FIG. 1 is a block diagram illustrating data placement in a cluster according to various embodiments of the present disclosure.

FIG. 1 is a block diagram illustrating data placement in a cluster 100 according to various embodiments of the present disclosure. As shown in FIG. 1, a cluster 100 includes, without limitation, four nodes 102, 110, 120, and 130. Node 102 includes global metadata 104. A cluster, such as cluster 100, is often embodied as a collection of computing nodes that can communicate between each other through a local area network or a backplane. Components of any of the disclosed distributed systems can comprise physically and/or logically distributed autonomous entities. Compute and storage resources can be integrated into a unit of a node. Multiple nodes can be interrelated into an array of nodes, whose nodes can be grouped into physical groupings (e.g., arrays) and/or into logical groupings or topologies of nodes (e.g., spoke-and-wheel topologies, rings, etc.). Such nodes in a cluster may be configured to store data sets in the form of multiple replicas in order to provide redundancy in the event of a disk failure, a node failure, and/or the like.

An extent group 140 is stored as a set of slices 112, slices 122, and slices 132 on node 110, node 120, and node 130, respectively. Slices, such as slices 112, slices 122, and slices 132, are also referred to herein as data slices. In some examples, slices are the basic unit of storage, and each slice includes up to 32 kilobytes (kB) of data. In general, metadata is tracked at the slice level. Slices 112, slices 122, and slices 132 include primary data blocks and secondary data blocks depending on whether there are storing the primary copy of a block or a replica of the block. Taken together, slices 112, 122, and 132 form extent group 140. Each of node 110, node 120, and node 130 makes independent decisions about slices 112, slices 122, and slices 132, respectively, including data format, whether data is stored as compressed data or uncompressed data, the storage tier used for the data, and/or the like. Node 110, node 120, and node 130 store parameters related to these decisions in local metadata 114, 124, and 134, respectively. Because each of node 110, node 120, and node 130 has separate and independent local metadata 114, 124, and 134, node 110, node 120, and node 130 can independently perform data management activity on slices 112, slices 122, and slices 132, respectively.

Global metadata 104 includes basic information about the nodes on which various extents and their replicas are located in the cluster 100. Further, in order to maintain data coherence across the various replicas, global metadata 104 includes version numbers for the various replicas stored on the cluster 100. As shown, global metadata 104 is stored on a single node 102. Additionally or alternatively, global metadata 104 may be stored in a distributed fashion on any combination of two or more nodes, such as nodes 102, 110, 120, and/or 130, included in the cluster 100. The persistent data storage layer of a cluster 100 in a storage system is typically organized as one or more extent groups. When a virtual machine or application program issues a request to access an extent group, a virtual disk controller accesses the global metadata 104 to determine the location of the extent group replicas. This metadata entry provides only the node 110, 120, or 130 and disk identifier information. The virtual disk controller then issues an access request to a corresponding virtual disk controller on the node 110, 120, or 130 where the replica resides. The request includes the disk identifier information, logical offset, and size of the slice that includes the requested data.

The node 110, 120, or 130 where the replica resides accesses respective slices 112, 122, or 132 to retrieve the requested data. In so doing, the node 110, 120, or 130 accesses local metadata 114, 124, or 134 to determine the actual storage device, physical offset, size, format, and other parameters of the slice corresponding to the requested data. The node 110, 120, or 130 translates the disk identifier, logical offset, and size included in the request to the actual storage device, physical offset, and size where the corresponding slices 112, 122, or 132 are locally stored. Storing local metadata 114, 124, or 134 locally on the various nodes 110, 120, or 130 rather than as part of global metadata 104 results in several advantages. One advantage is that local metadata 114, 124, or 134 relieves the burden from the one or more nodes that store global metadata 104. To access the data stored in local metadata 114, 124, or 134, the corresponding nodes 110, 120, or 130 do not need to access global metadata 104. As a result, the total size and storage burden for global metadata 104 is reduced relative to prior approaches. In addition, the one or more nodes that store global metadata 104 experience reduced accesses to global metadata 104 and fewer updates to global metadata 104, relative to prior approaches. As a result, the likelihood of a bandwidth bottleneck related to accesses and updates of global metadata 104 is reduced.

It will be appreciated that the system shown herein is illustrative and that variations and modifications are possible. In one example, the cluster 100 is shown as having four nodes. However, the cluster 100 may have more nodes or fewer nodes within the scope of the present disclosure. Further, a storage system may have any number of clusters, such as cluster 100, within the scope of the present disclosure. In another example, cluster 100 is shown as having a dedicated node 102 that stores global metadata 104 associated with slices 112, 122, and 132 stored on other nodes 110, 120, and 130, respectively. However, the cluster may store global metadata 104 on any combination of one or more nodes of the cluster 100, including nodes that additionally includes slices for the cluster 100, such as nodes 110, node 120, and/or node 130.

Figure 2:
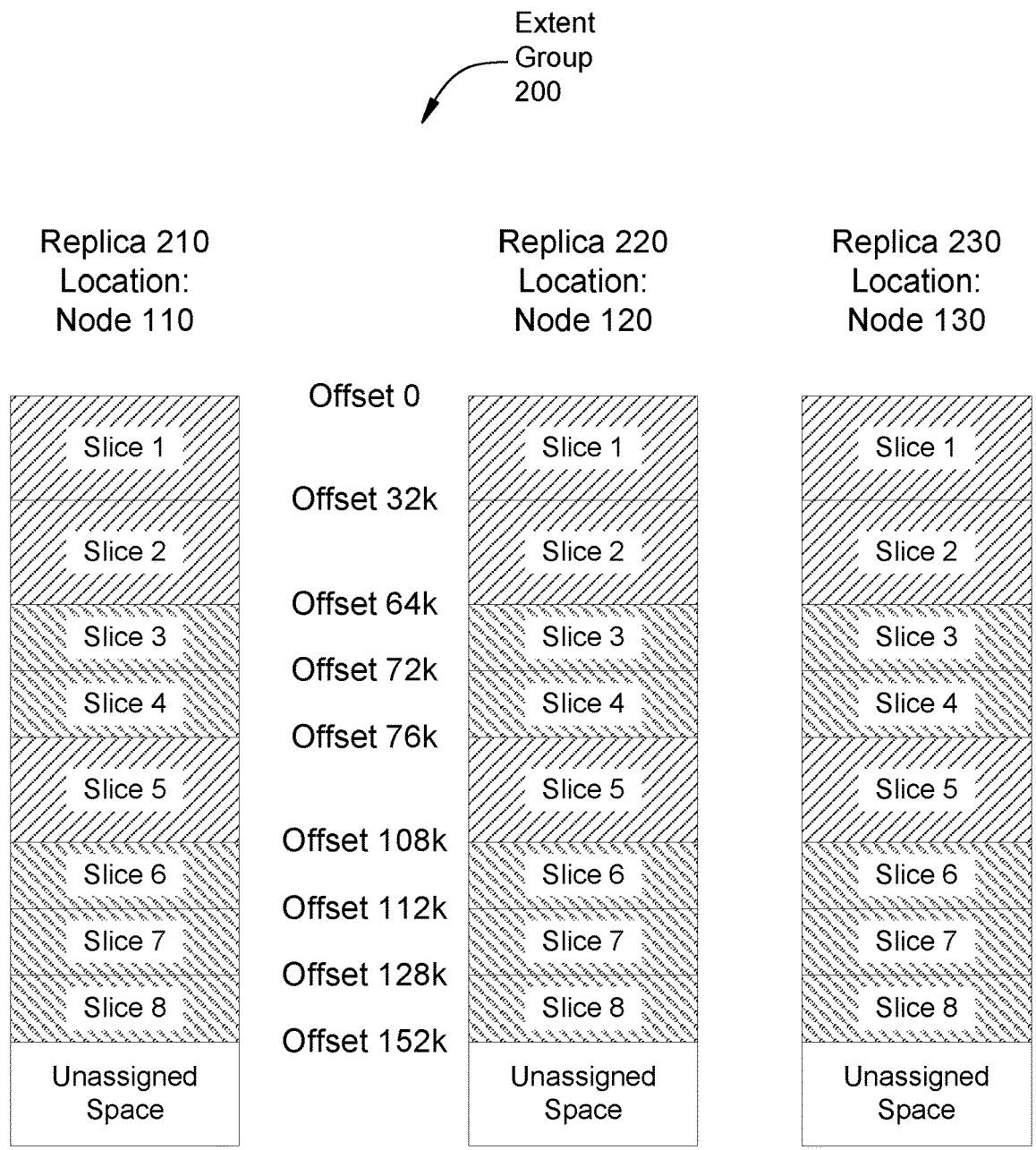
FIG. 2 illustrates a configuration of data blocks in an extent group in mirror mode according to various embodiments of the present disclosure.

FIG. 2 illustrates a configuration of data blocks in an extent group 200 in mirror mode according to various embodiments of the present disclosure. The persistent data storage layer of a cluster 100 in a storage system is typically organized as one or more extent groups. Each extent in the extent group includes a set of one or more slices stored on various nodes of the cluster 100. Data is allocated to nodes and transformed from one format to another format on a slice-by-slice basis. When initially configured, the extent group 200 includes slices that are replicated on multiple nodes in the cluster 100 based on the replication factor. In some examples, and as shown in FIG. 2, the slices included in the extent group 200 can be mirrored, such that the replicated slices stored on the multiple nodes are formatted identically. As shown, the extent group 200 includes replica 210, stored on node 110, replica 220, stored on node 120, and replica 230, stored on node 130. In some examples, replica 210 is designated as the primary copy, and replicas 220 and 230 are designated as secondary copies. The number of replicas is based on the replication factor (RF). For RF=2, the extent group 200 includes a primary replica 210 and one secondary replica 220. For RF=3, the extent group 200 includes a primary replica 210 and two secondary replicas 220 and 230. As shown in the legend 205, replicas 210, 220, and 230 include uncompressed slices and compressed slices, represented by different shading patterns.

Replica 210 includes three uncompressed slices: slice 1, slice 2, and slice 5. As shown in the examples of FIG. 2, each uncompressed slice has a size of 32 kilobytes (kB). Slice 1 is stored at addresses that range from offset 0 to offset 32 k, slice 2 is stored from offset 32 k to offset 64 k, and slice 5 is stored from offset 76 k to offset 108 k. The size of individual compressed slices varies based on the compression format selected for the respective compressed slices, the compressibility of the data stored in the compressed slices, and/or the like. Compressed slice 3 has a size of 8 kB and is stored from offset 64 k to offset 72 k. Each of compressed slices 4 and 6 has a size of 4 kB. Compressed slices 4 and 6 are stored from offset 72 k to offset 76 k and from offset 108 k to offset 112 k, respectively. Compressed slice 7 has a size of 16 kB and is stored from offset 112 k to offset 128 k. Compressed slice 8 has a size of 24 kB and is stored from offset 128 k to offset 152 k. Replica 210 includes unassigned space beginning at offset 152 k. The unassigned space is available for storing additional slices for the cluster 100 as those slices are written to replica 210. In some embodiments, the compressed slices may be of any arbitrary size. In such embodiments, the allocated space for compressed slices may be upsized to align with certain offset boundaries, such as to the nearest offset that is divisible by 4 k, for ease of data access. Although FIG. 2 shows slices having various sizes and offsets, it is understood that FIG. 2 is representative of but one example and different numbers, combinations, sizes, offsets, and/or the like are possible for different extent groups.

Storing replicas on nodes in mirrored mode has certain advantages. One advantage of mirrored mode is that only node 110 for the primary replica 210 determines which slices are compressed or uncompressed, the format for each compressed slice, the offset and size for each slice, and/or the like. Nodes 120 and 130, storing secondary replicas 220 and 230, respectively, directly write the slices received from node 110 at the specified offset without further processing of the data in the slice. Note that the base addresses for the replicas 210, 220, and 230 may be different on the different nodes 110, 120, and 130. However, in mirrored mode, the offset for the replicas 210, 220, and 230 relative to the base address are the same. Only node 110 is burdened with the processing overhead of determining the expected data access pattern of the slice and performing compression on slices that are expected to be cold slices. Another advantage of mirrored mode is that because all replicas are formatted identically, recovery from a node and/or disk failure is straightforward. Re-replicating the lost replicas after a node and/or disk failure consists of performing a raw data copy from one node to another node, without performing any compression or decompression when transferring slices from one node to another node.

In mirrored mode, the logical format of each slice of the extent group 200 is maintained in synchronization among all of the replicas 210, 220, and 230 of the extent group 200. Consequently, slices 1-8 of replica 220 are formatted identically to respective slices 1-8 of replica 210. Likewise, slices 1-8 of replica 230 are formatted identically to respective slices 1-8 of replica 210 and respective slices 1-8 of replica 220. Further, because slices 1-8 are formatted identically across replicas 210, 220, and 230, the local metadata 114, 124, and 134 representing replicas 210, 220, and 230, respectively, have the same offset relative to a base address and the same storage format. Certain other local metadata 114, 124, and 134 representing replicas 210, 220, and 230, respectively, may have different base addresses and other parameters specific to the different physical devices on the different nodes 110, 120, and 130. Over time, nodes 110, 120, and 130 independently perform data management activities on replicas 210, 220, and 230, respectively. In so doing, nodes 110, 120, and 130 independently update the local metadata 114, 124, and 134, respectively to reflect those independent data management activities.

Figure 3:
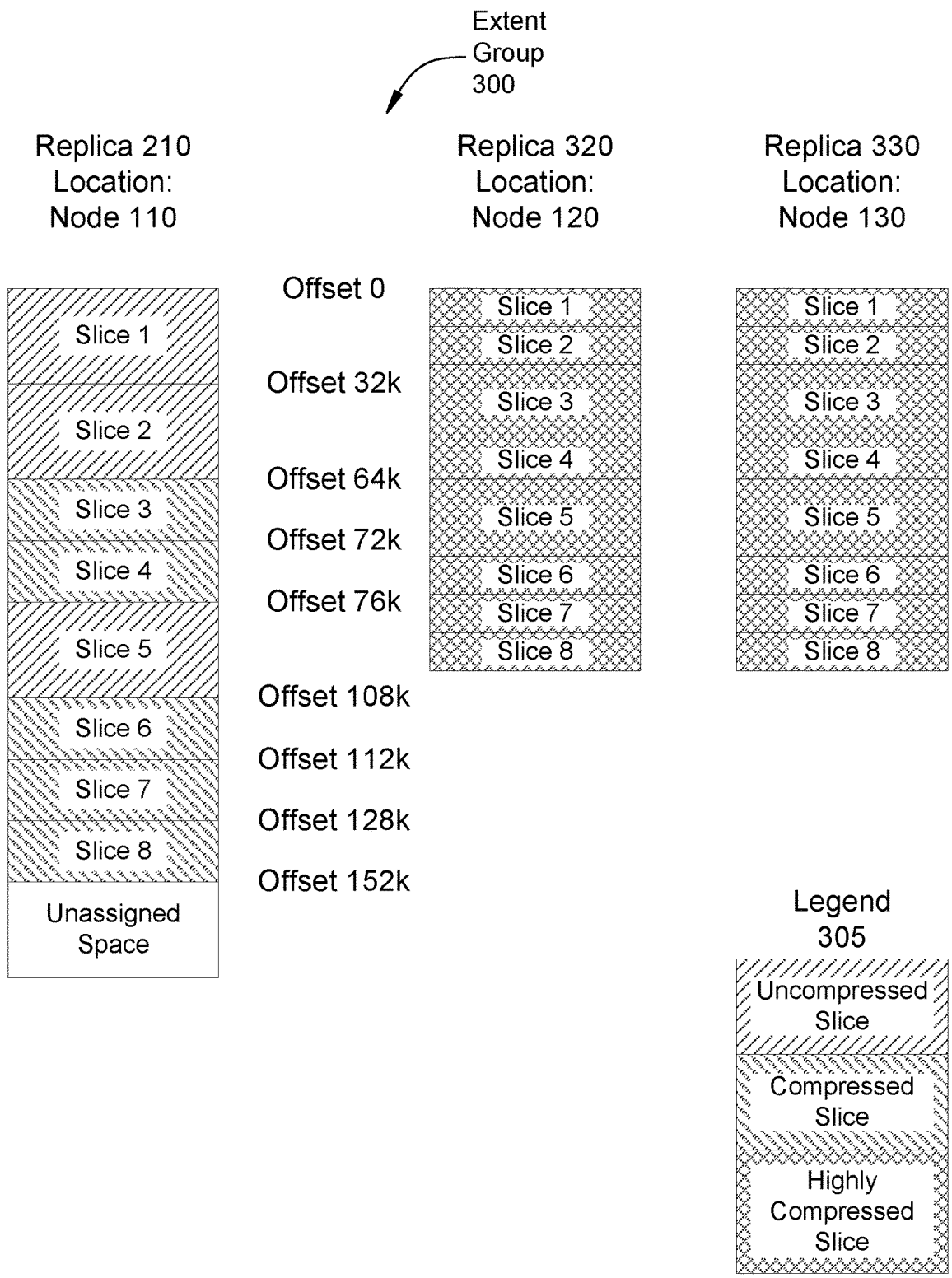
FIG. 3 illustrates an extent group with independent encoding of primary and secondary replicas according to various embodiments of the present disclosure.

FIG. 3 illustrates an extent group 300 with independent encoding of primary and secondary replicas according to various embodiments of the present disclosure. As shown, the extent group 300 includes a primary replica 210 as described in conjunction with FIG. 2. The extent group 300 further includes secondary replicas 320 and 330, corresponding to replicas 220 and 230 of FIG. 2, respectively. As shown, nodes 120 and 130 have transformed replicas 320 and 330 independently from replica 210. In some examples, the primary replica 210 is stored in an untransformed format to facilitate frequent access of the slices by one or more client devices. Replicas 320 and 330 represent copies of replica 210 that are accessed only when node 110 experiences a data failure, such as a disk failure, a node failure, and/or the like. Because replicas 320 and 330 are rarely accessed, the slices included in replicas 320 and 330 can be stored in a highly compressed format and in relatively low performance storage media. As shown in the legend 305, replica 210, includes uncompressed slices and compressed slices, while replicas 220, and 230 include highly compressed slices, represented by different shading patterns.

Because nodes 110, 120, and 130 maintain separate and independent local metadata 114, 124, and 134, nodes 110, 120, and 130 can decouple and independently modify the format of the slices in each of the respective replicas 210, 320, and 330 over time. Each of local metadata 114, 124, and 134 includes metadata describing the slices included in replicas 210, 320, and 330, respectively. This local metadata 114, 124, and 134 includes the list of slices, the extent group offset of each slice, the size of each slice, the checksum of each slice, various other physical attributes of the extent group, and/or the like. Such physical attributes include whether the slice is uncompressed or compressed, the compression format of the slice (if compressed), whether the slice is encrypted or not, the encryption format of the slice (if encrypted), the storage tier on which the slice is stored, and/or the like.

With separate and independent local metadata 114, 124, and 134 located with each replica 210, 320, and 330, nodes 110, 120, and 130 each replica 210, 320, and 330 may be independent from one another. More specifically, the format of the slices included in each replica can have a unique format from corresponding slices on other replicas, selected based on the unique characteristics of the slices for that specific replica. As the nodes 110, 120, and 130 change aspects of the respective locally-stored replicas 210, 320, and 330, the nodes 110, 120, and 130 update local metadata 114, 124, and 134, respectively, to reflect the changed aspects of the replicas 210, 320, and 330. For example, if a node 110, 120, or 130 changes the compression format, encryption format, storage tier, and/or the like of a replica 210, 320, and 330, then the node 110, 120, or 130 correspondingly updates the local metadata 114, 124, and 134 to reflect the changes to the replica 210, 320, and 330.

In some examples, corresponding slices stored on different replicas can be stored on different tiers of storage, where each tier of storage may have different performance and capacity specification. In general, as the performance of a storage tier increases, the capacity of the storage tier decreases. As a result, storage tiers with high performance (low access time) tend to have relatively low storage capacity. Storage tiers with low performance (high access time) tend to have relatively high storage capacity. Each node 110, 120, and 130 can have a variety of storage tiers, such as non-volatile memory express (NVMe), solid-state drives (SSDs), hard disk drives (HDDs), and/or the like. When a virtual machine launches on a particular node in the cluster 100, scheduling algorithms consider the available compute, memory, and/or storage resources on the node to determine the best format for the slices that the virtual machine accesses on the same node. In general, storage input/output (I/O) operations initiated by the virtual machine are directed towards the slices in the replicas stored locally on the node that is executing the virtual machine. As a result, the virtual machine typically does not need to access slices over a network that reside on other nodes in the cluster 100, which can be slower than accessing slices on the local node.

In some examples, the virtual machine and/or application programs executed within the virtual machine may have a read versus write I/O ratio skewed more towards reads, such as 80% reads and 20% writes. Further, the virtual machine and/or application programs can have a dynamic and changing working set. As referred to herein, the working set is defined by the location and amount of data being accessed by the virtual machine and/or application programs at any given point in time. For a virtual machine or application program that has a certain pattern of read operations and write operations, the virtual machine or application program generally optimizes for data locality in order to improve performance. In general, the node to which the initial write of a data block is directed becomes the node that stores the primary replica 210 of the extent group 300. As a result, regardless of the data access pattern, the node that stores the primary replica 210 continues to perform local reads from the primary replica 210. This approach advantageously provides high performance for an extent group 300 that is identified as read hot. In some examples, if the node that stores the primary replica 210 performs write operations to the primary replica 210, the write operations are synchronously replicated to the secondary replicas 320 and 330 before acknowledging a write request back to the client. In this manner, all replicas of the extent group 300 remain in synchronization during write operations. The secondary replicas 320 and 330 can often remain idle and are only accessed in case of a failure. Therefore, nodes 120 and 130 place respective replicas 320 and 330 in a slower, high-capacity storage tier. Further, nodes 120 and 130 can store respective replicas 320 and 330 in a more highly compressed format in order to reduce storage space. However, if another node performs an access, the request may be routed to another node with a replica as identified in the global metadata 104, even if the node with a replica does not store the primary replica 210. Such a condition can impact the data access pattern of the corresponding replica on the other node associated with the requesting node.

Whether replicas are currently stored in mirrored mode, as shown in FIG. 2, or are independently encoded, as shown in FIG. 3, each node can perform a scan of the locally stored replica and, in response, can perform one or more data management activities based on the results of the scan. Because the nodes 110, 120, and 130 in a cluster 100 maintain separate and independent local metadata 114, 124, and 134, the nodes 110, 120, and 130 can make independent determinations regarding the format, storage tier, and/or the like for each replica stored by the corresponding node. Typically, the nodes 110, 120, and 130 periodically scan the replicas 210, 320, 330 and determine resulting data management activities to perform on the replicas 210, 320, 330 in response to a trigger condition. Such a trigger condition can include any one or more of a command received from a processor, an expiration of a periodic scan timer, an interrupt signal, and/or the like. Additionally or alternatively, the trigger condition can include any one or more of access time-based criteria, event-based criteria, input/output pattern-based criteria, or decision-based criteria.

In some examples, the node detects a trigger condition based on access time-based criteria. In so doing, the node determines whether the replica is cold, read hot, or write hot, as described herein. The node determines whether the replica is cold, as indicated by the time of the last read access (Tr) and the time of the last write access (Tw) being earlier than a threshold timestamp (X). The node determines whether the replica is cold based on Equation (1) below:

$$\text{Cold when Tr}<X \text{ and Tw}<X \tag{1}$$

The threshold timestamp (X) can be configured by the cluster or the node and can be a fixed value or a value relative to the current time. A replica is determined to be cold if the replica has not been receiving read accesses or write accesses since the threshold timestamp (X). In some examples, the threshold timestamp X can be set to the current time minus 24 hours. If the node determines that a replica is cold, then the node can move the replica to a lower-performance storage tier, transform the replica into a very highly compressed format (such as LZ4HC), and/or the like. As a result, data retrieval for a cold replica is generally slower due to the processing needed to decompress a replica that has been highly compressed. The slower data retrieval is generally acceptable for a cold replica because the data access pattern for replica suggests that the replica is rarely, if ever, accessed, and the very highly compressed format achieves high storage efficiency.

The node further determines whether the replica is read hot, as indicated by the time of the last read access (Tr) being later than a threshold timestamp (X) and the time of the last write access (Tw) being earlier than the threshold timestamp (X). The node determines whether the replica is read hot based on Equation (2) below:

$$\text{Read Hot when Tr}>X \text{ and Tw}<X \tag{2}$$

A replica is determined to be read hot if the replica has been receiving read accesses but has not been receiving write accesses since the threshold timestamp (X). In some examples, a read hot replica is a common data access pattern for a local replica that has been designated as a primary replica. If the node determines that a replica is read hot, then the node can move the replica to a medium-performance storage tier, transform the replica into a moderately compressed format (such as LZ24) that provides storage efficiency and fast read access, and/or the like.

The node further determines whether the replica is write hot, as indicated by the time of the last write access (Tw) being later than a threshold timestamp (X). The node determines whether the replica is write hot based on Equation (3) below:

$$\text{Write Hot when Tw}>X \tag{3}$$

A replica is determined to be write hot if the replica has been receiving write accesses since the threshold timestamp (X). If the node determines that a replica is write hot, then the node can move the replica to a higher-performance storage tier, transform the replica into an uncompressed format that provides fast read and write access and minimizes read-modify-write operations, and/or the like.

In some examples, the node detects a trigger condition based on event-based criteria. With event-based criteria, each node designates the replica stored on the node as a primary replica or as a secondary replica. If a node designates the replica stored locally on the node as a primary replica, then the node stores the replica in a relatively high-performance storage tier and with relatively low or no compression. If a node designates the replica stored remotely on a different node as a secondary replica, then the node stores the replica in a relatively low-performance storage tier and with relatively high compression.

In some examples, a node performs migration operations in order to additionally make transformation decisions for a replica by utilizing a local transformation technique. With this technique, the primary (local) replica can be retained in a high-performance storage tier in an uncompressed format or at a lower-yield, high-performance compression level. The secondary (remote) replica(s) can be migrated to a lower-performance storage tier, such as an HDD tier, and can be compressed to a highest-level compression format.

This local transformation technique advantageously reduces the space utilization of the secondary (remote) non-accessed replica, while high-performance access to the primary replica is retained. In addition, this local transformation technique advantageously enables the migration process to be faster and more efficient, because the amount of data to be migrated by the nodes for the secondary replica(s) is reduced due to the higher compression of the secondary replica(s).

In some examples, the node detects a trigger condition based on input/output (I/O) pattern-based criteria. With I/O pattern-based criteria, each node determines the I/O pattern (sequential or random), I/O size, and/or the like to determine the compression level for the replica and/or whether checksums are enabled for the replica. In some examples, each node makes this determination so as to minimize read-modify-write operations. In general, with I/O pattern-based criteria, the node compares the unit of access (that is, the size of each I/O transaction) with the size of a compressed data block to determine the number of access units needed to transfer the entire compressed block. When a data block is compressed, the entire compressed block is read on future accesses, because the data block is decompressed to perform read operations or write operations and then recompressed to store the data block. If the unit of access is smaller than the compressed size of the data block, then the node performs multiple accesses to transfer, checksum, and decompress a single data block, referred to as read amplification. In some examples, if an uncompressed block has a unit size of 32 kB, and the uncompressed block achieves 30% compression, then the size of the stored data block is 32 kB*(100%−30%)= 22.4 kB. If the unit of access for future read operations is 8 kB, then the read operation for the compressed data block incurs a read amplification 22.4 kB−8 kB=14.4 kB in order to checksum and decompress the compressed data block. This read amplification occurs because the entire 22.4 kB is read even if the target of the read operation or write operation is limited to an 8 kB portion of the compressed data block.

Each node analyzes the I/O pattern for data blocks included in an extent group replica, based on real-time analysis, hints from an application program, and/or the like. Based on this analysis, each node can independently determine the optimal unit of access for a given replica stored on the node. Given the above-described example, a first node may determine that the replica stored on the first node is accessed rarely. Therefore, the first node may determine an 8 kB unit of access for the 22.4 kB compressed block. The 8 kB unit of access incurs a read amplification 22.4 kB−8 kB=14.4 kB. However, because the I/O access pattern indicates that the replica is rarely accessed, the 14.4 kB read amplification is rarely realized. A second node may determine that the replica stored on the second node is accessed somewhat more often than the replica stored on the first node. Therefore, the second node may determine a 16 kB unit of access for the 22.4 kB compressed block. The 16 kB unit of access incurs a read amplification 22.4 kB−16 kB=6.4 kB. In addition, the second node may compress the data block with a slightly lower compression rate and also reduce read amplification relative to the first node. In this manner, each node selects a different unit of access based on the I/O pattern of access for the replica stored on the node. Additionally or alternatively, each node may select a different unit of access based on any combination of the access time criteria described herein.

In some examples, the node detects a trigger condition based on decision-based criteria, such as the storage tier selected for the replica. With decision-based criteria, each node selects the compression format, available data management activities, and/or the like based on what is best suited and/or available for the storage tier selected for the replica. In some examples, node employing decision-based criteria can select different compression formats and data transformation operations for different types of storage, such as high-capacity disk drives employing shingled magnetic recording (SMR) technology, cloud-based object storage technology, SSDs, HDDs, and/or the like.

Upon detecting a trigger condition, the node scans the locally stored replica to determine whether various slices in the replica can benefit from transformation to a different format, compression scheme, storage tier, and/or the like. Over time, each node 110, 120, and 130 updates respective local metadata 114, 124, and 134 to track various parameters for the slices stored locally on the nodes 110, 120, and 130. The various parameters include time of most recent access, number of accesses since the most recent scan, and/or the like. During a scan, a node 110, 120, or 130 analyzes respective local metadata 114, 124, and 134 to determine whether to change the format, storage tier, and/or the like of one or more slices.

During the scan, the node 110, 120, or 130 determines whether the current format and/or storage tier of a slice is suitable for the actual data access pattern indicated by parameters such as the time of most recent access and the number of accesses since the most recent scan. The determination as to whether the current format and storage tier is suitable for the actual data access pattern can be based on local metadata 114, 124, and 134 and can be made by the local node 110, 120, or 130. Additionally or alternatively, the determination as to whether the current format and storage tier is suitable for the actual access data pattern can be based on data access patterns of other slices within the same node 110, 120, or 130. Over time, each node continuously tracks the access pattern of slices stored on the local node 110, 120, or 130. Based on these access patterns, each node performs data management activities on the slices stored on that node and, correspondingly, updates local metadata 114, 124, and 134.

Additionally or alternatively, if the current format of the slice is unsuitable for the actual access pattern, then the node 110, 120, or 130 can change a compression format of the slice. If the current format of the slice reflects an access pattern that is better suited to a higher access rate for the slice than the actual access pattern, then the node 110, 120, or 130 can transform an uncompressed slice to a compressed format or can transform a compressed slice to a more highly compressed format. If the current format of the slice reflects an access pattern that is better suited to a lower access rate for the slice than the actual access pattern, then the node 110, 120, or 130 can transform a compressed slice to a more lightly compressed format or to an uncompressed format. In some examples, when the node 110, 120, or 130 is transforming a slice from one compression format to another compression format, the node 110, 120, or 130 locks the slice from access by virtual machines, application programs, and other nodes to prevent data errors that may occur from multiple virtual machines accessing the slice while the transformation process is in progress.

Additionally or alternatively, if the current format of the slice is unsuitable for the actual access pattern, then the node 110, 120, or 130 can change the storage tier where the slice is stored. If the current format of the slice reflects a storage tier that is better suited to a higher access rate for the slice than the actual access pattern, then the node 110, 120, or 130 can transfer the slice from a lower-performance, higher-capacity storage tier to a higher-performance, lower-capacity storage tier. If the current format of the slice reflects a storage tier that is better suited to a lower access rate for the slice than the actual access pattern, then the node 110, 120, or 130 can transfer the slice from a higher-performance, lower-capacity storage tier to a lower-performance, higher-capacity storage tier.

In addition, during the scan, the node 110, 120, or 130 performs various maintenance tasks on locally stored slices, such as checksum validation of the slices, garbage collection to delete slices that are no longer referenced by the global metadata 104, and/or the like. Slices stored on various storage tiers are subject to bit errors due to various causes. Therefore, slices are typically stored with error detection and/or correction (EDC) code words, such as checksum data, cyclic redundancy codes (CRCs), and/or the like. The node 110, 120, or 130 compares the EDC code words stored in the slice with corresponding EDC code words for the slice as stored in local metadata 114, 124, or 134. If the EDC code words stored in the slice do not match corresponding EDC code words for the slice as stored in local metadata 114, 124, or 134, then the slice has one or more bit errors. If possible, the node 110, 120, or 130 corrects the bit errors locally. Additionally or alternatively, the node 110, 120, or 130 restores the slice by performing a replacement operation. When performing the replacement operation, the node 110, 120, or 130 requests a copy of the slice stored on a different node for transfer to the local node 110, 120, or 130. In so doing, the node 110, 120, or 130 transforms the slice into the format indicated by the local metadata 114, 124, or 134 before storing the copy of the slice on the local node 110, 120, or 130. Further, if a node 110, 120, or 130 discovers that a slice is no longer referenced in the global metadata 104, then the node 110, 120, or 130 dereferences the slice by performing a deletion operation. When performing the deletion operation, the node 110, 120, or 130 deletes the parameters for that slice as stored in the local metadata 114, 124, or 134.

Figure 4:
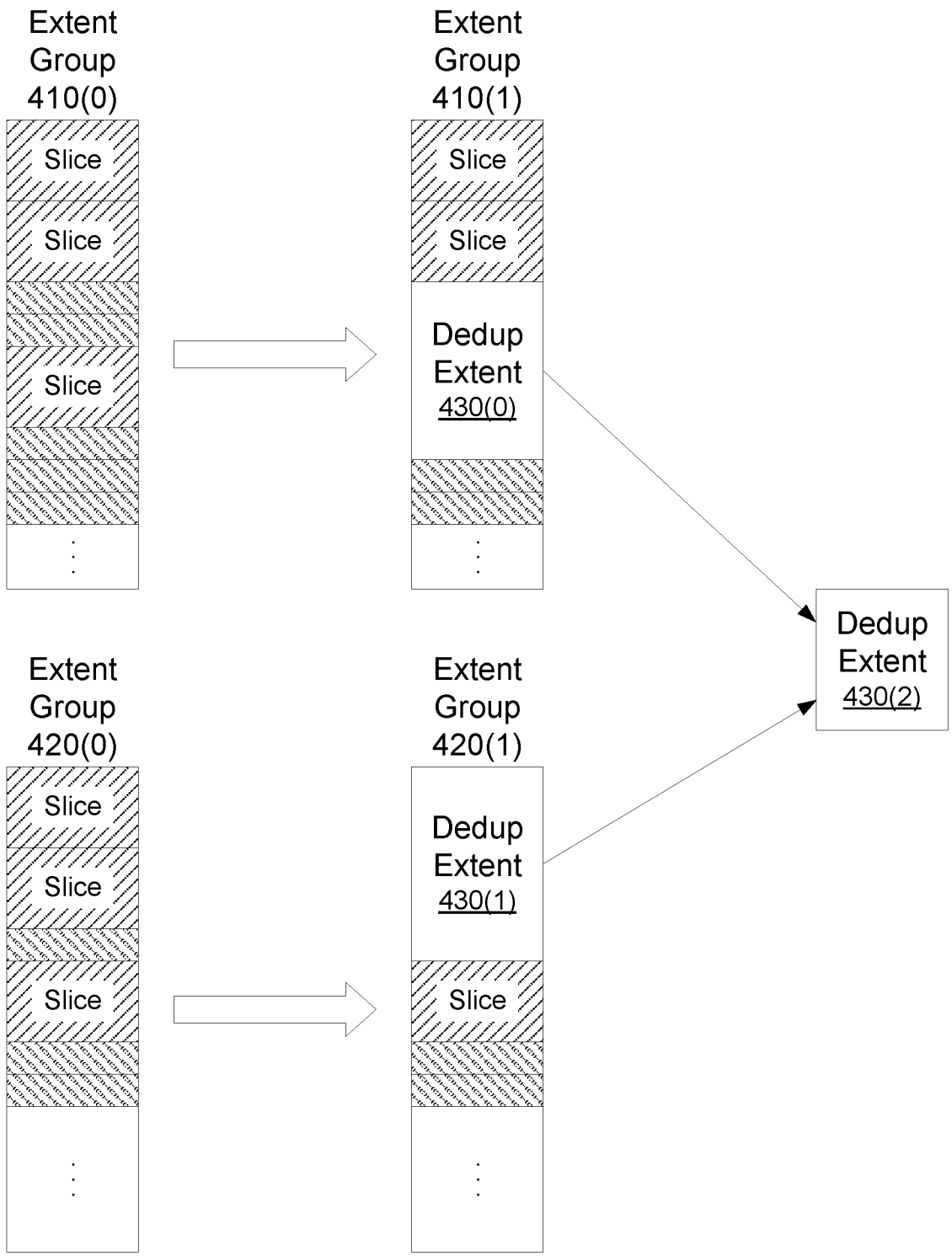
FIG. 4 illustrates node local deduplication in an extent group according to various embodiments of the present disclosure.

FIG. 4 illustrates node local deduplication in an extent group according to various embodiments of the present disclosure. Deduplication is a process by which a node 110, 120, or 130 deletes redundant copies of locally stored data. Redundant data occurs when a slice is stored on more than one storage element of a storage tier and/or when a slice is stored on multiple storage tiers. Because the location, size, format, and other parameters of slices are stored in local metadata 114, 124, and 134 that resides locally on the nodes 110, 120, and 130, the nodes 110, 120, and 130 perform deduplication operations more efficiently relative to prior approaches that only employ global metadata 104.

When performing a deduplication operation, a node 110, 120, or 130 computes data fingerprints on the extent group replicas that are being scanned across all the storage devices on the node. The node 110, 120, or 130 computes data fingerprints to map short bit strings from an arbitrarily large data item, such as a slice. For each computed data fingerprint, the node 110, 120, or 130 determines how many different slices on the node 110, 120, or 130 include the data fingerprint. The yield for a particular data fingerprint is the number of different slices that include the particular data fingerprint. A data fingerprint with a yield that is less than a threshold number of slices is referred to as a low-yield data fingerprint. Similarly, a data fingerprint with a yield that is more than a threshold number of slices is referred to as a high-yield data fingerprint. For all the high-yield data fingerprints that are detected, the node 110, 120, or 130 compacts the extent groups by moving the deduplicated regions corresponding to the high-yield data fingerprints to a new single deduplication extent group. The node 110, 120, or 130 generates an indirection pointer in the original local metadata for the source data that points to the new location of the deduplication extent group.

As shown, node 110 includes a replica for a first extent group 410(0) and a replica for a second extent group 420(0). During deduplication, node 110 identifies various sections of data that are included in both the replica for the first extent group 410(0) and the replica for the second extent group 420(0). Node 110 moves these various sections of data included in the replica for the first extent group 410(0) into a single deduplication extent 430(0), as shown by the modified replica for the first extent group 410(1). Similarly, node 110 moves these various sections of data included in the replica for the second extent group 420(0) into the single deduplication extent 430(1), as shown by the modified replica for the second extent group 420(1). Node 110 consolidates deduplication extents 430(0) and 430(1) into a single deduplication extent 430(2) and deletes the original deduplication extents 430(0) and 430(1), thereby reducing storage size of the replicas. Node 110 updates the local metadata 114 to include a pointer that redirects accesses to the data originally included in deduplication extents 430(0) and 430(1) to instead access the data in deduplication extent 430(2). Node 110 performs these deduplications locally and independently by accessing and updating local metadata 114 without needing to access or update global metadata 104.

As described herein, when a virtual machine or application program issues a request to access a data stored in an extent group, the virtual disk controller accesses global metadata to determine the location of the extent group replicas. This metadata entry provides only the node and disk identifier information. The virtual disk controller then issues a request, providing the disk identifier, logical offset, and size of the data requested. When this request reaches the node where the replica is located, the node accesses the local metadata in order to translate the disk identifier, logical extent offset, and size to the actual storage device, physical offset, and size in the extent group file. The node accesses the replica based on the actual storage device, physical offset, and size specified by the local metadata. Further, the local metadata includes the checksum of the replica, in order to aid the node in determining whether the replica has been corrupted. In addition, the local metadata includes information regarding various other physical attributes of the replica. Such physical attributes include whether the replica is uncompressed or compressed, the compression format of the replica (if compressed), whether the replica is encrypted or not, the encryption format of the replica (if encrypted), the storage tier on which the replica is stored, and/or the like. When servicing the request, the node performs additional operations as specified by the local metadata, such as decompression, decryption, routing the request to a particular storage tier, and/or the like. If a deduplication pointer is present in the local metadata for the requested data, then the requested access is further redirected to the deduplication extent group where the data associated with the request actually resides.

Figure 5:
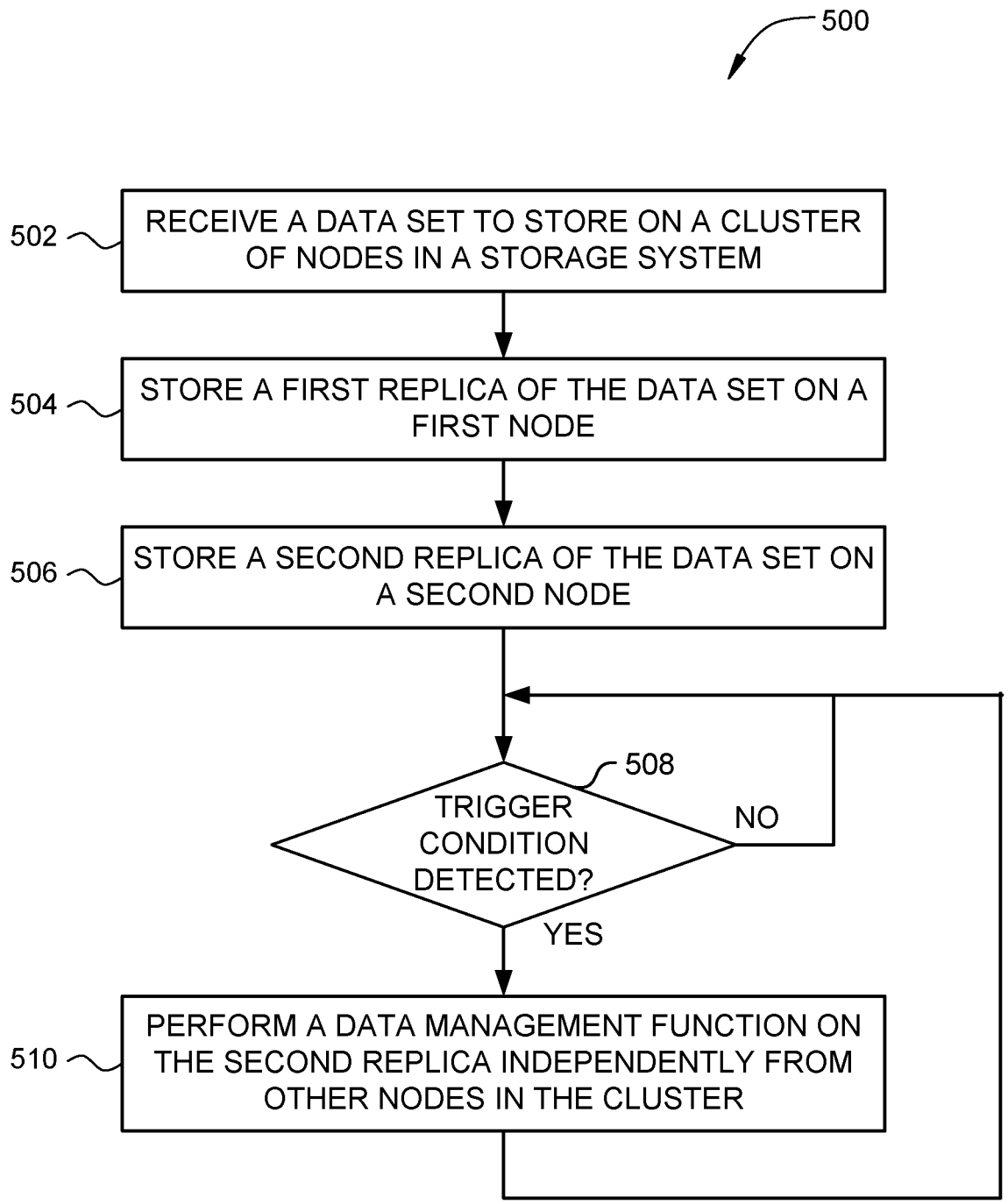
FIG. 5 is a flow diagram of method steps for maintaining replicas of a data set according to various embodiments of the present disclosure.

FIG. 5 is a flow diagram of method steps for maintaining replicas of a data set according to various embodiments of the present disclosure. Although the method steps are described in conjunction with the systems of FIGS. 1-4 and 6A-7, persons skilled in the art will understand that any system configured to perform the method steps, in any order, is within the scope of the present disclosure.

As shown, a method 500 begins at step 502, where a storage system receives a data set to store on a cluster of nodes included in the storage system. A cluster is often embodied as a collection of computing nodes that can communicate between each other through a local area network or a backplane. Components of any of the foregoing distributed systems can comprise physically and/or logically distributed autonomous entities. Compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Such nodes in a cluster can be configured to store data sets in the form of multiple replicas in order to provide redundancy in the event of a disk failure, a node failure, and/or the like.

At step 502, the processor associated with a first node in the cluster stores a first replica of the data set on the first node. In so doing, the processor associated with the first node determines various parameters associated with the first replica for the first node. In some examples, the processor associated with the node determines a storage tier for the first replica being stored on the node. Each node can have a variety of storage tiers, such as non-volatile memory express (NVMe), solid-state drives (SSDs), hard disk drives (HDDs), and/or the like. If the first replica is anticipated to be accessed at a relatively high rate, then the processor associated with the first node selects a storage tier with high performance. Such a storage tier typically has a relatively low access time and a relatively low storage capacity. If the first replica is anticipated to be accessed at a relatively low rate, then the processor associated with the first node selects a storage tier with low performance. Such a storage tier typically has a relatively high access time and a relatively low storage capacity.

In some examples, the processor associated with the first node determines a compression format for the first replica based on an anticipated access pattern for the first replica. If the expected access pattern for the first replica indicates a higher access rate for the first replica, then the first replica can be stored in an uncompressed or lightly compressed format. If the expected access pattern indicates a lower access rate for the first replica, then the first replica can be stored in a compressed or highly compressed format.

In some examples, the processor associated with the first node determines an encryption format for the first replica. If the data security level for the first replica is relatively low or non-existent, then the first node can store the first replica in an unencrypted format or in a relatively low-security encryption format. If the data security level for the first replica is relatively high, then the first node can store the first replica in a relatively robust, high-security encryption format. In some examples, the processor associated with the first node determines a general security level for the first node. If the first node is considered to have a higher security risk, then the processor associated with the first node is more likely to encrypt the first replica. Additionally or alternatively, if the first node supports processes for multiple users, then the processor associated with the first node is more likely to encrypt the first replica. By contrast, if the first node is considered to have a lower security risk and/or supports a single user, then the processor associated with the first node is less likely to encrypt the first replica.

In some examples, the processor associated with the first node determines a free space within the selected storage tier in which to store the first replica. The processor determines a free space with a size that is sufficiently large to store the first replica, given the storage tier, the compression format (if any), the encryption format (if any), and/or the like. The location of the free space can be specified as an offset from a base address.

The processor associated with the first node updates local metadata to reflect the parameters of the first replica stored on the first node. In some examples, the first node updates local metadata to reflect the storage tier, the compression format, the encryption format, and/or the like of the first replica. In addition, the first node updates local metadata to reflect a mapping between a logical disk identifier, logical offset, and size for the first replica to an actual storage device, physical offset, and size for the first replica as stored on the first node.

At step 506, the processor associated with a second node in the cluster stores a second replica of the data set on the second node. In so doing, the processor associated with the second node determines various parameters associated with the second replica for the second node using the techniques described for step 504. The processor associated with the second node determines these various parameters independently from the first node. As a result, the second replica stored on the second node can be stored in a format that differs from the format of the first replica stored on the first node with respect to storage tier, compression format, encryption format, and/or the like. The processor associated with the second node updates local metadata to reflect the parameters of the second replica stored on the second node.

In some examples, processors associated with additional nodes in the cluster stores additional replicas of the data set on the additional nodes as needed based on the replication factor. The total number of nodes performing their own version of step 504 is equal to replication factor. For example, if the replication factor is 3, then a third node stores a third replica using the techniques for step 504.

At step 508, for each node included in the cluster that is assigned to store a replica of the data set, a processor associated with the node determines whether a trigger condition has been detected. In so doing, the processor associated with the node detects any one or more of a command received from a processor, an expiration of a periodic scan timer, an interrupt signal, and/or the like. In response, the processor associated with the node performs a local scan of replicas stored on the node to determine whether a trigger condition has been met, where the trigger condition indicates that a data management activity should be performed. The trigger condition can include any one or more of access time-based criteria, event-based criteria, input/output pattern-based criteria, or decision-based criteria. In some examples, the node detects a trigger condition based on access time-based criteria, where the node analyzes access patterns of a replica to determine whether the replica is cold, read hot, or write hot. In some examples, the node detects a trigger condition based on event-based criteria, where the node designates the replica stored on the node as a primary replica or as a secondary replica. In some examples, the node detects a trigger condition based on input/output (I/O) pattern-based criteria, where the node determines the I/O pattern (sequential or random), I/O size, and/or the like to determine the compression level for the replica and/or whether checksums are enabled for the replica. In some examples, the node detects a trigger condition based on decision-based criteria, where the node selects the compression format, available data management activities, and/or the like based on what is best suited and/or available for the storage tier selected for the replica.

If the processor on a node determines that a trigger condition has not been detected, then the method 500 returns to step 508 to continue to wait for a trigger condition. If, however, the processor determines that a trigger condition has been detected, then the method 500 proceeds to step 510, where the node performs a data management function on the replica independently from other nodes included in the cluster.

In some embodiments, a node in the cluster performs data management activities in response to a scan of replicas located on the node. The scan is initiated in response to the trigger condition detected at step 508. During the scan, the node determines whether the expected data access pattern of a slice, as indicated by the current format and storage tier, is suitable for the actual data access pattern indicated by parameters such as the time of most recent access and the number of accesses since the most recent scan. If the current format of the slice is unsuitable for the actual access pattern, then the node can recompute and update the local metadata to conform to the actual data access pattern. Further, the node can change a compression format of the slice and/or move the slice to a different storage tier with a different performance level and/or capacity.

In so doing, the node determines whether there has been a change in an access pattern for a slice, such as whether the access pattern for the slice has changed to cold, read hot, write hot, and/or the like. For example, when the access pattern for the slice has become cold, as indicated by the time of the last read access and the time of the last write access being earlier than a threshold timestamp, the node can move the slice to a lower-performance storage tier, transform the slice into a very highly compressed format, and/or the like. As another example, when the node determines that the access pattern for the slice has become read hot, as indicated by the time of the last read access being later than a threshold timestamp and the time of the last write access being earlier than the threshold timestamp, the node can move the slice to a medium-performance storage tier, transform the slice into a moderately compressed format that provides storage efficiency and fast read access, and/or the like. As yet another example, when the node determines that the access pattern for the slice is write hot, as indicated by the time of the last write access being later than a threshold timestamp, the node can move the slice to a higher-performance storage tier, transform the slice into an uncompressed format that provides fast read and write access, and/or the like.

In some examples, when the node has detected a trigger condition based on an event-based criteria, the node can designate the replica stored on the node as a primary replica or as a secondary replica. If a node designates the replica stored on the node as a primary replica, then the node stores the replica in a relatively high-performance storage tier and with relatively low or no compression. If a node designates the replica stored on the node as a secondary replica, then the node stores the replica in a relatively low-performance storage tier and with relatively high compression.

In some examples, when the node has detected a trigger condition based on input/output (I/O) pattern-based criteria, the node determines the I/O pattern (sequential or random), I/O size, and/or the like to determine the compression level for the replica and/or whether checksums are enabled for the replica. In some examples, when the node has detected a trigger condition based on decision-based criteria, such as storage tier selected for the replica, the node selects the compression format, available data management activities, and/or the like based on what is best suited and/or available for the storage tier selected for the replica.

When performing the data management function, the node accesses and/or updates local metadata stored on the node. When performing the data management function, the node generally does not access or update global metadata or local metadata located on other nodes and associated with replicas stored on other nodes.

The data management activities may further include various maintenance tasks on locally stored slices, such as checksum validation of the slices, garbage collection to delete slices that are no longer referenced by the global metadata, and/or the like.

If the node determines that the EDC code words stored in the slice does not match corresponding EDC code words for the slice as stored in local metadata, then the slice has one or more bit errors. If possible, the node corrects the bit errors locally. Additionally or alternatively, the node restores the slice by requesting a copy of the slice stored on a different node for transfer to the local node. In so doing, the node transforms the slice into the format indicated by the local metadata before storing the copy of the slice on the local node. Further, if a node discovers that a slice is no longer referenced in the global metadata, then the node deletes the parameters for that slice as stored in the local metadata. The method 500 then returns to step 508 to check for another trigger condition.

As discussed above and further emphasized here, FIG. 5 is merely an example which should not unduly limit the scope of the claims. One of ordinary skill in the art would recognize many variations, alternatives, and modifications. In some embodiments, steps 502-506 are repeated each time a new data set is received for storage by the cluster of nodes. In these embodiments, steps 502-506 are repeated independently and separately from the repetitions of steps 508 and 510.

Exemplary Virtualization System Architectures

According to some embodiments, all or portions of any of the foregoing techniques described with respect to FIGS. 1-5 can be partitioned into one or more modules and instances within, or as, or in conjunction with a virtualized controller in a virtual computing environment. Some example instances within various virtual computing environments are shown and discussed in further detail in FIGS. 6A-6D. Consistent with these embodiments, a virtualized controller includes a collection of software instructions that serve to abstract details of underlying hardware or software components from one or more higher-level processing entities. In some embodiments, a virtualized controller can be implemented as a virtual machine, as an executable container, or within a layer (e.g., such as a layer in a hypervisor). Consistent with these embodiments, distributed systems include collections of interconnected components that are designed for, or dedicated to, storage operations as well as being designed for, or dedicated to, computing and/or networking operations.

In some embodiments, interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

In some embodiments, a hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

In some embodiments, physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

Figure 6A:
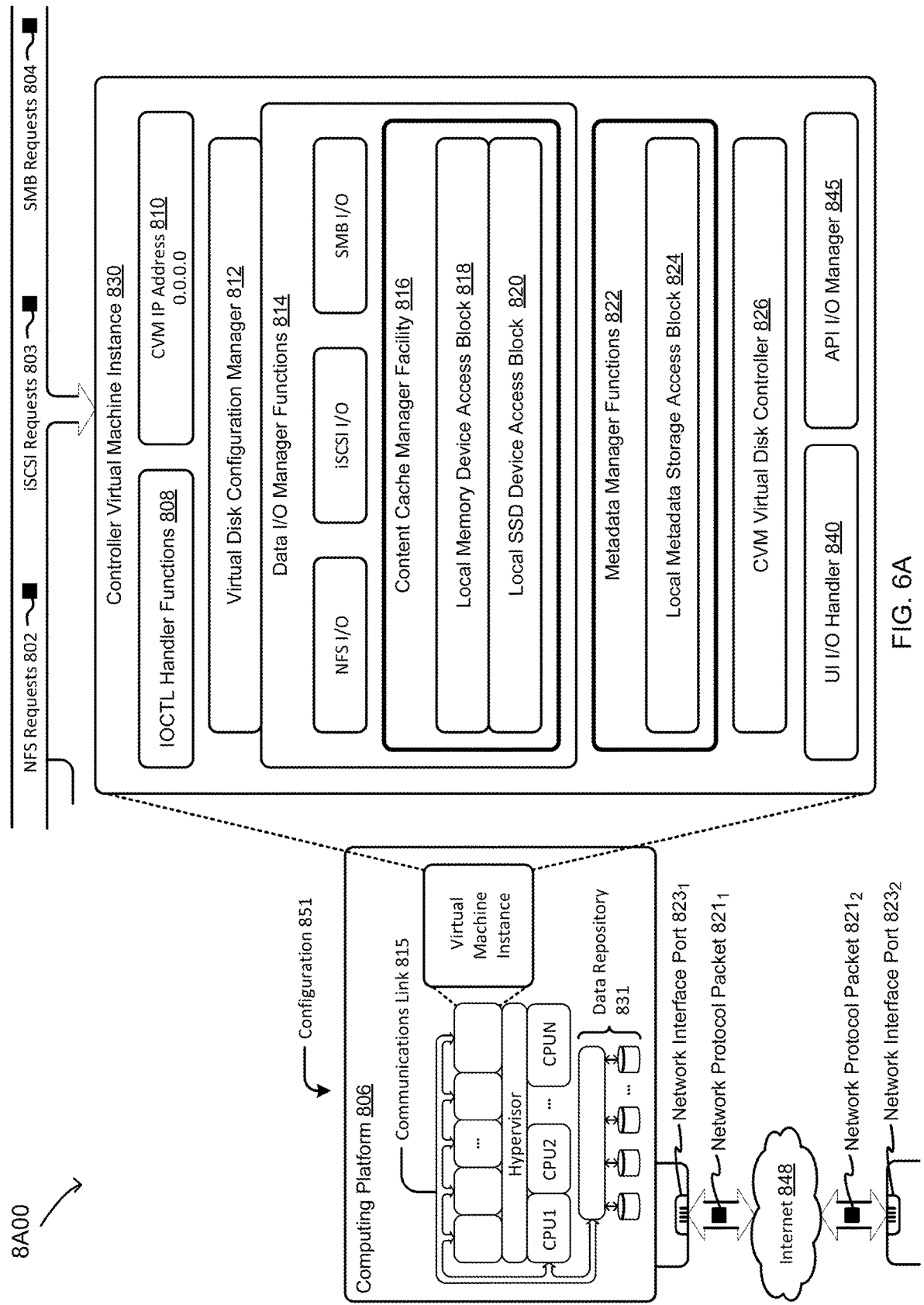
FIGS. 6A-6D are block diagrams illustrating virtualization system architectures configured to implement one or more aspects of the present embodiments.

FIG. 6A is a block diagram illustrating virtualization system architecture 8A00 configured to implement one or more aspects of the present embodiments. As shown in FIG. 6A, virtualization system architecture 8A00 includes a collection of interconnected components, including a controller virtual machine (CVM) instance 830 in a configuration 851. Configuration 851 includes a computing platform 806 that supports virtual machine instances that are deployed as user virtual machines, or controller virtual machines or both. Such virtual machines interface with a hypervisor (as shown). In some examples, virtual machines may include processing of storage I/O (input/output or IO) as received from any or every source within the computing platform. An example implementation of such a virtual machine that processes storage I/O is depicted as CVM instance 830.

In this and other configurations, a CVM instance 830 receives block I/O storage requests as network file system (NFS) requests in the form of NFS requests 802, internet small computer storage interface (iSCSI) block IO requests in the form of iSCSI requests 803, Samba file system (SMB) requests in the form of SMB requests 804, and/or the like. The CVM instance 830 publishes and responds to an internet protocol (IP) address (e.g., CVM IP address 810). Various forms of input and output can be handled by one or more IO control handler functions (e.g., IOCTL handler functions 808) that interface to other functions such as data IO manager functions 814 and/or metadata manager functions 822. As shown, the data IO manager functions can include communication with virtual disk configuration manager 812 and/or can include direct or indirect communication with any of various block IO functions (e.g., NFS IO, iSCSI IO, SMB IO, etc.).

In addition to block IO functions, configuration 851 supports IO of any form (e.g., block IO, streaming IO, packet-based IO, HTTP traffic, etc.) through either or both of a user interface (UI) handler such as UI IO handler 840 and/or through any of a range of application programming interfaces (APIs), possibly through API IO manager 845.

Communications link 815 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), formatting of bit fields into fixed-length blocks or into variable length fields used to populate the payload, and/or the like. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

Computing platform 806 include one or more computer readable media that is capable of providing instructions to a data processor for execution. In some examples, each of the computer readable media may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random-access persistent memories (RAPMs) or optical or magnetic media drives such as paper tape or magnetic tape drives. Volatile media includes dynamic memory such as random-access memory (RAM).

As shown, controller virtual machine instance 830 includes content cache manager facility 816 that accesses storage locations, possibly including local dynamic random-access memory (DRAM) (e.g., through local memory device access block 818) and/or possibly including accesses to local solid-state storage (e.g., through local SSD device access block 820).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 831, which in turn can be formatted into any one or more storage areas, and which can comprise parameterized storage accessible by a key (e.g., a filename, a table name, a block address, an offset address, etc.). Data repository 831 can store any forms of data and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 824. The data repository 831 can be configured using CVM virtual disk controller 826, which can in turn manage any number or any configuration of virtual disks.

Execution of a sequence of instructions to practice certain of the disclosed embodiments is performed by one or more instances of a software instruction processor, or a processing element such as a data processor, or such as a central processing unit (e.g., CPU1, CPU2, ..., CPUN). According to certain embodiments of the disclosure, two or more instances of configuration 851 can be coupled by communications link 815 (e.g., backplane, LAN, PSTN, wired or wireless network, etc.) and each instance may perform respective portions of sequences of instructions as may be required to practice embodiments of the disclosure.

The shown computing platform 806 is interconnected to the Internet 848 through one or more network interface ports (e.g., network interface port $823_1$ and network interface port $823_2$). Configuration 851 can be addressed through one or more network interface ports using an IP address. Any operational element within computing platform 806 can perform sending and receiving operations using any of a range of network protocols, possibly including network protocols that send and receive packets (e.g., network protocol packet $821_1$ and network protocol packet $821_2$).

Computing platform 806 may transmit and receive messages that can be composed of configuration data and/or any other forms of data and/or instructions organized into a data structure (e.g., communications packets). In some cases, the data structure includes program instructions (e.g., application code) communicated through the Internet 848 and/or through any one or more instances of communications link 815. Received program instructions may be processed and/or executed by a CPU as it is received and/or program instructions may be stored in any volatile or non-volatile storage for later execution. Program instructions can be transmitted via an upload (e.g., an upload from an access device over the Internet 848 to computing platform 806). Further, program instructions and/or the results of executing program instructions can be delivered to a particular user via a download (e.g., a download from computing platform 806 over the Internet 848 to an access device).

Configuration 851 is merely one example configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

In some embodiments, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to management of block stores. Various implementations of the data repository comprise storage media organized to hold a series of records and/or data structures.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 6B:
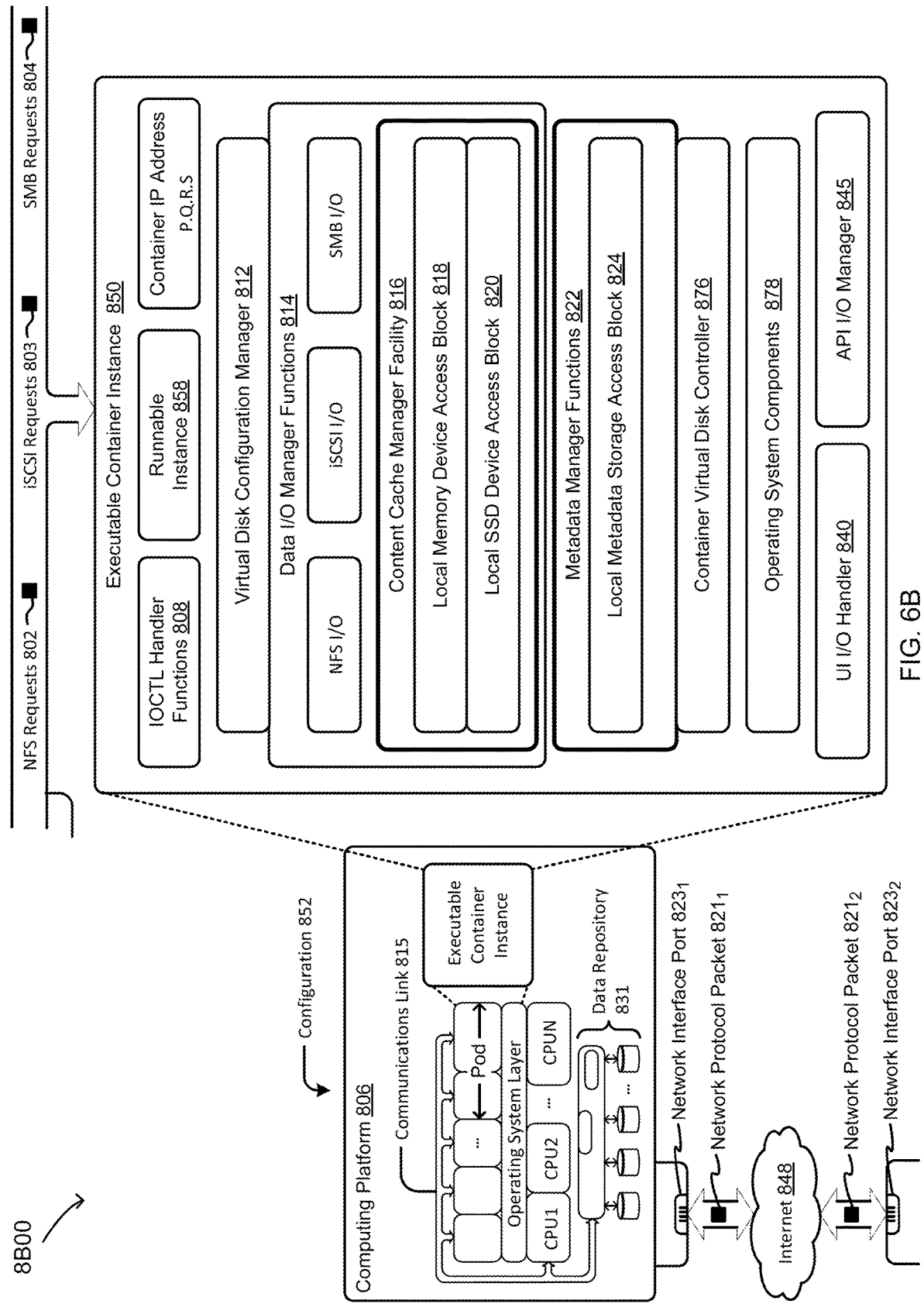

FIG. 6B depicts a block diagram illustrating another virtualization system architecture 8B00 configured to implement one or more aspects of the present embodiments. As shown in FIG. 6B, virtualization system architecture 8B00 includes a collection of interconnected components, including an executable container instance 850 in a configuration 852. Configuration 852 includes a computing platform 806 that supports an operating system layer (as shown) that performs addressing functions such as providing access to external requestors (e.g., user virtual machines or other processes) via an IP address (e.g., "P.Q.R.S", as shown). Providing access to external requestors can include implementing all or portions of a protocol specification (e.g., "http:") and possibly handling port-specific functions. In some embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node may communicate directly with storage devices on the second node.

The operating system layer can perform port forwarding to any executable container (e.g., executable container instance 850). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance can serve as an instance of an application container or as a controller executable container. Any executable container of any sort can be rooted in a directory system and can be configured to be accessed by file system commands (e.g., "ls" or "ls—a", etc.). The executable container might optionally include operating system components 878, however such a separate set of operating system components need not be provided. As an alternative, an executable container can include runnable instance 858, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 876. Such a container virtual disk controller can perform any of the functions that the aforementioned CVM virtual disk controller 826 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 6C:
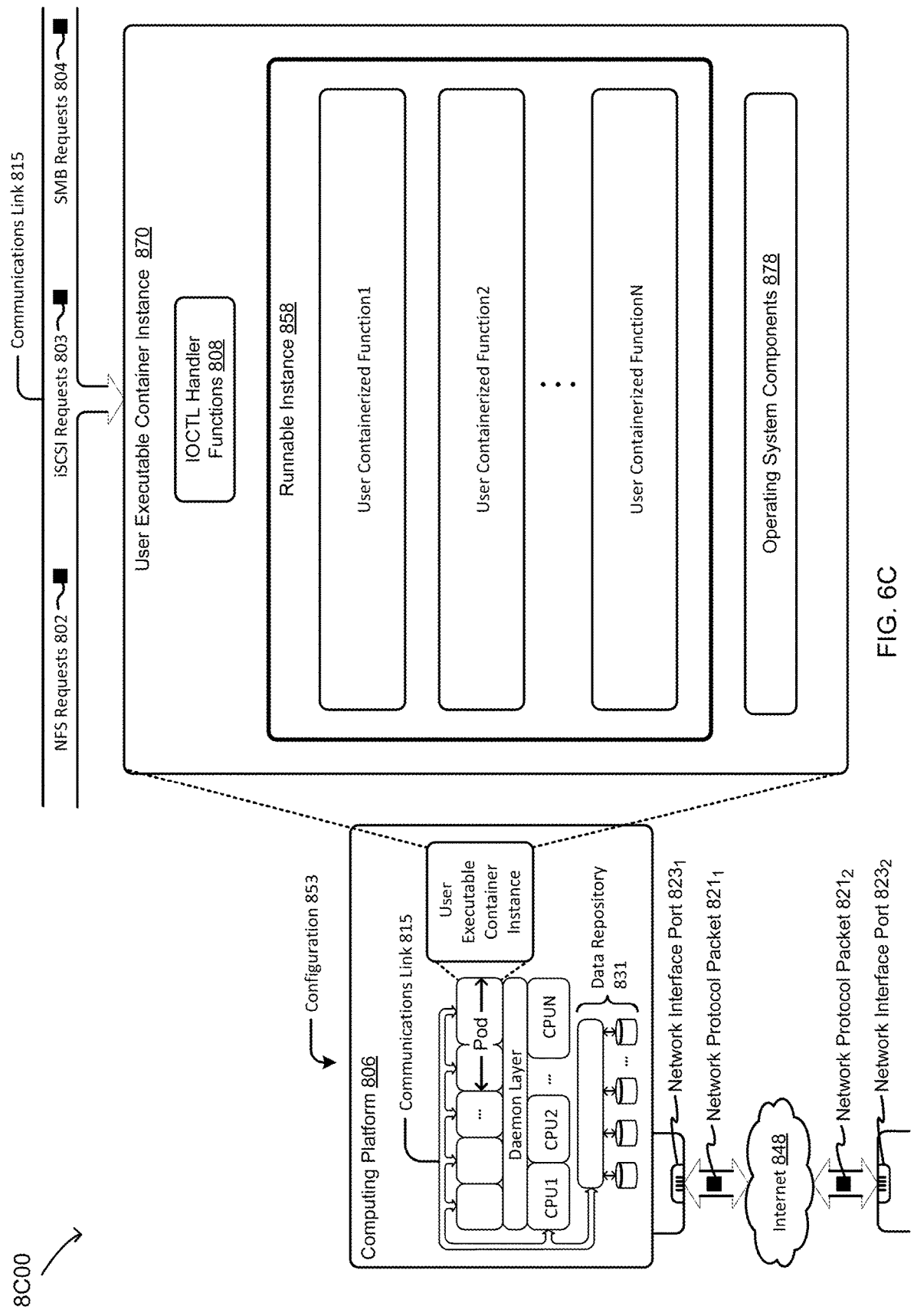

FIG. 6C is a block diagram illustrating virtualization system architecture 8C00 configured to implement one or more aspects of the present embodiments. As shown in FIG. 6C, virtualization system architecture 8C00 includes a collection of interconnected components, including a user executable container instance in configuration 853 that is further described as pertaining to user executable container instance 870. Configuration 853 includes a daemon layer (as shown) that performs certain functions of an operating system.

User executable container instance 870 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 858). In some cases, the shown operating system components 878 comprise portions of an operating system, which portions are interfaced with or included in the runnable instance and/or any user containerized functions. In some embodiments of a daemon-assisted containerized architecture, computing platform 806 might or might not host operating system components other than operating system components 878. More specifically, the shown daemon might or might not host operating system components other than operating system components 878 of user executable container instance 870.

In some embodiments, the virtualization system architecture 8A00, 8B00, and/or 8C00 can be used in any combination to implement a distributed platform that contains multiple servers and/or nodes that manage multiple tiers of storage where the tiers of storage might be formed using the shown data repository 831 and/or any forms of network accessible storage. As such, the multiple tiers of storage may include storage that is accessible over communications link 815. Such network accessible storage may include cloud storage or networked storage (e.g., a SAN or storage area network). Unlike prior approaches, the disclosed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In some embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

In some embodiments, any one or more of the aforementioned virtual disks can be structured from any one or more of the storage devices in the storage pool. In some embodiments, a virtual disk is a storage abstraction that is exposed by a controller virtual machine or container to be used by another virtual machine or container. In some embodiments, the virtual disk is exposed by operation of a storage protocol such as iSCSI or NFS or SMB. In some embodiments, a virtual disk is mountable. In some embodiments, a virtual disk is mounted as a virtual storage device.

In some embodiments, some or all of the servers or nodes run virtualization software. Such virtualization software might include a hypervisor (e.g., as shown in configuration 851) to manage the interactions between the underlying hardware and user virtual machines or containers that run client software.

Distinct from user virtual machines or user executable containers, a special controller virtual machine (e.g., as depicted by controller virtual machine instance 830) or as a special controller executable container is used to manage certain storage and I/O activities. Such a special controller virtual machine is sometimes referred to as a controller executable container, a service virtual machine (SVM), a service executable container, or a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

Figure 6D:
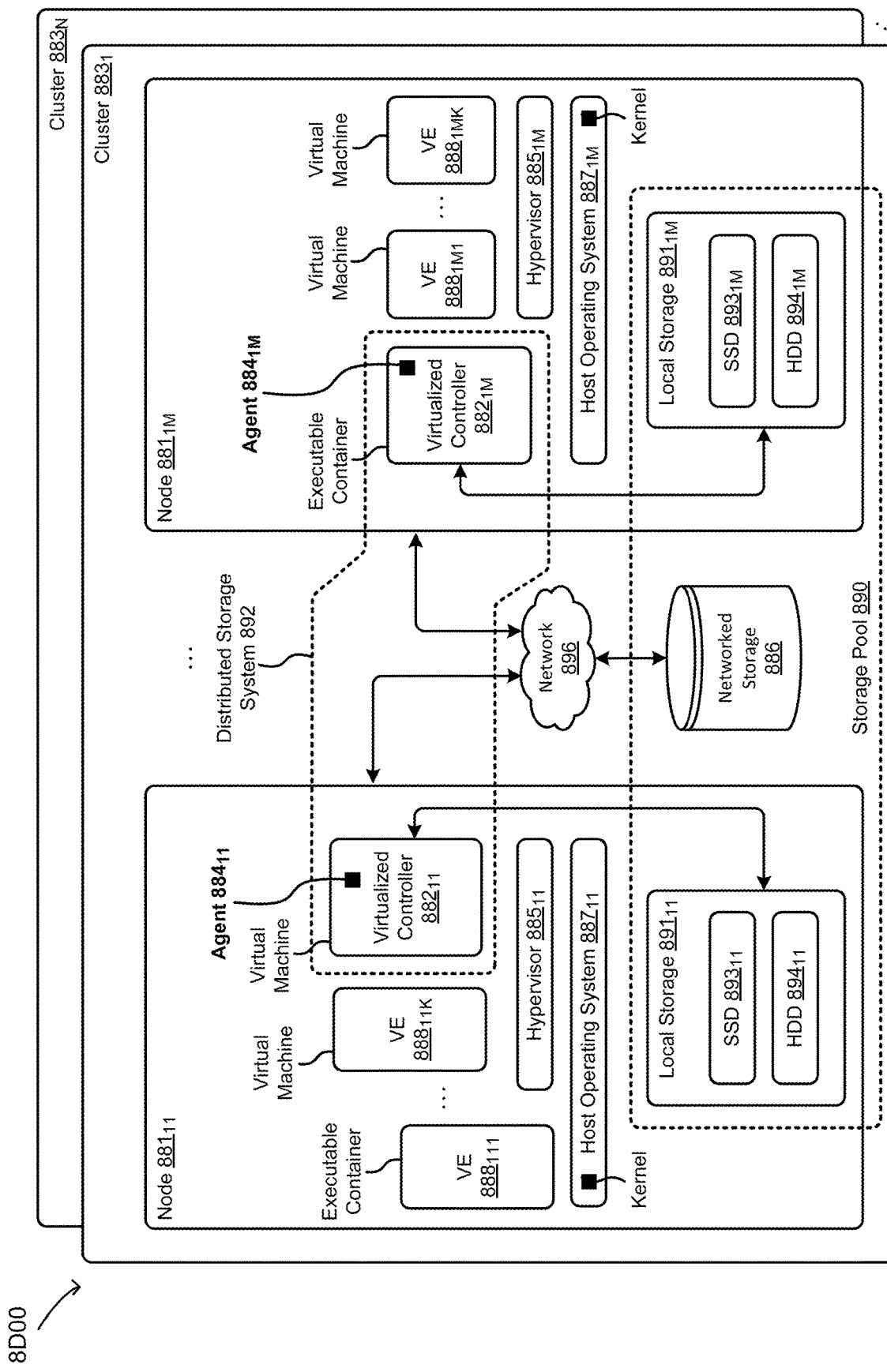

FIG. 6D is a block diagram illustrating virtualization system architecture 8D00 configured to implement one or more aspects of the present embodiments. As shown in FIG. 6D, virtualization system architecture 8D00 includes a distributed virtualization system that includes multiple clusters (e.g., cluster $883_1$, . . . , cluster $883_N$) comprising multiple nodes that have multiple tiers of storage in a storage pool. Representative nodes (e.g., node $881_{11}$, . . . , node $881_{1M}$) and storage pool 890 associated with cluster $883_1$ are shown. Each node can be associated with one server, multiple servers, or portions of a server. The nodes can be associated (e.g., logically and/or physically) with the clusters. As shown, the multiple tiers of storage include storage that is accessible through a network 896, such as a networked storage 886 (e.g., a storage area network or SAN, network attached storage or NAS, etc.). The multiple tiers of storage further include instances of local storage (e.g., local storage $891_{11}$, . . . , local storage $891_{1M}$). For example, the local storage can be within or directly attached to a server and/or appliance associated with the nodes. Such local storage can include solid state drives (SSD $893_{11}$, . . . , SSD $893_{1M}$), hard disk drives (HDD $894_{11}$, . . . , HDD $894_{1M}$), and/or other storage devices.

As shown, any of the nodes of the distributed virtualization system can implement one or more user virtualized entities (e.g., VE $888_{111}$, . . . , VE $888_{11K}$, . . . , VE $888_{1M1}$, . . . , VE $888_{1MK}$), such as virtual machines (VMs) and/or executable containers. The VMs can be characterized as software-based computing "machines" implemented in a container-based or hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $887_{11}$, . . . , host operating system $887_{1M}$), while the VMs run multiple applications on various respective guest operating systems. Such flexibility can be facilitated at least in part by a hypervisor (e.g., hypervisor $885_{11}$, . . . , hypervisor $885_{1M}$), which hypervisor is logically located between the various guest operating systems of the VMs and the host operating system of the physical infrastructure (e.g., node).

As an alternative, executable containers may be implemented at the nodes in an operating system-based virtualization environment or in a containerized virtualization environment. The executable containers are implemented at the nodes in an operating system virtualization environment or container virtualization environment. The executable containers can include groups of processes and/or resources (e.g., memory, CPU, disk, etc.) that are isolated from the node host computer and other containers. Such executable containers directly interface with the kernel of the host operating system (e.g., host operating system $887_{11}$, . . . , host operating system $887_{1M}$) without, in most cases, a hypervisor layer. This lightweight implementation can facilitate efficient distribution of certain software components, such as applications or services (e.g., micro-services). Any node of a distributed virtualization system can implement both a hypervisor-assisted virtualization environment and a container virtualization environment for various purposes. Also, any node of a distributed virtualization system can implement any one or more types of the foregoing virtualized controllers so as to facilitate access to storage pool 890 by the VMs and/or the executable containers.

Multiple instances of such virtualized controllers can coordinate within a cluster to form the distributed storage system 892 which can, among other operations, manage the storage pool 890. This architecture further facilitates efficient scaling in multiple dimensions (e.g., in a dimension of computing power, in a dimension of storage space, in a dimension of network bandwidth, etc.).

In some embodiments, a particularly configured instance of a virtual machine at a given node can be used as a virtualized controller in a hypervisor-assisted virtualization environment to manage storage and I/O (input/output or IO) activities of any number or form of virtualized entities. For example, the virtualized entities at node $881_{11}$ can interface with a controller virtual machine (e.g., virtualized controller $882_{11}$) through hypervisor $885_{11}$ to access data of storage pool 890. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 892. For example, a hypervisor at one node in the distributed storage system 892 might correspond to software from a first vendor, and a hypervisor at another node in the distributed storage system 892 might correspond to a second software vendor. As another virtualized controller implementation example, executable containers can be used to implement a virtualized controller (e.g., virtualized controller $882_{1M}$) in an operating system virtualization environment at a given node. In this case, for example, the virtualized entities at node $881_{1M}$ can access the storage pool 890 by interfacing with a controller container (e.g., virtualized controller $882_{1M}$) through hypervisor $885_{1M}$ and/or the kernel of host operating system $887_{1M}$.

In some embodiments, one or more instances of an agent can be implemented in the distributed storage system 892 to facilitate the herein disclosed techniques. Specifically, agent $884_{11}$ can be implemented in the virtualized controller $882_{11}$, and agent $884_{1M}$ can be implemented in the virtualized controller $882_{1M}$. Such instances of the virtualized controller can be implemented in any node in any cluster. Actions taken by one or more instances of the virtualized controller can apply to a node (or between nodes), and/or to a cluster (or between clusters), and/or between any resources or subsystems accessible by the virtualized controller or their agents.

Exemplary Computer System

Figure 7:
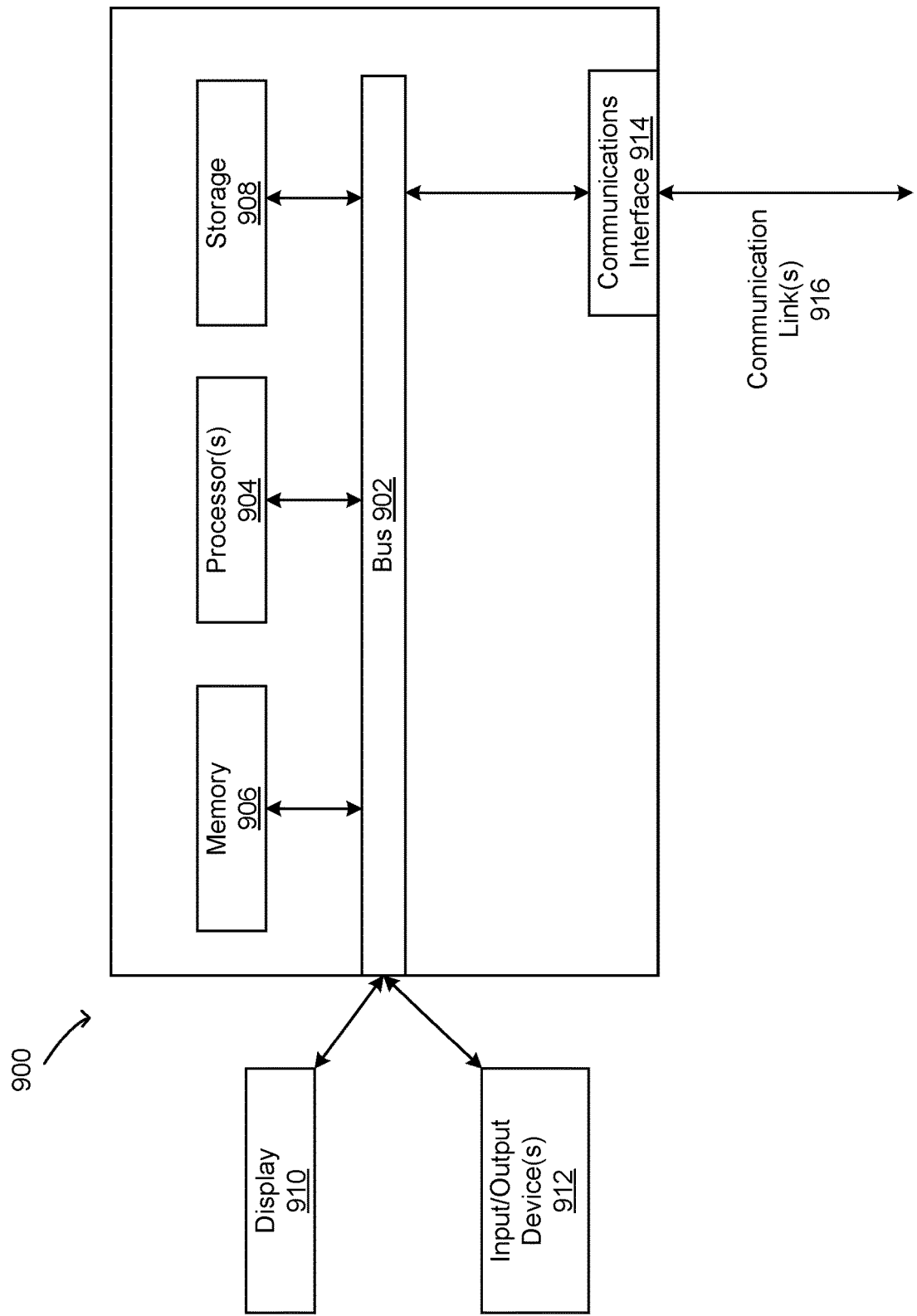
FIG. 7 is a block diagram illustrating a computer system configured to implement one or more aspects of the present embodiments.

FIG. 7 is a block diagram illustrating a computer system 900 configured to implement one or more aspects of the present embodiments. In some embodiments, computer system 900 is a server machine operating in a data center or a cloud computing environment suitable for implementing an embodiment of the present invention. As shown, computer system 900 includes a bus 902 or other communication mechanism for communicating information, which interconnects subsystems and devices, such as one or more processors 904, memory 906, storage 908, optional display 910, one or more input/output devices 912, and a communications interface 914. Computer system 900 described herein is illustrative and any other technically feasible configurations fall within the scope of the present disclosure.

The one or more processors 904 include any suitable processors implemented as a central processing unit (CPU), a graphics processing unit (GPU), an application-specific integrated circuit (ASIC), a field programmable gate array (FPGA), an artificial intelligence (AI) accelerator, any other type of processor, or a combination of different processors, such as a CPU configured to operate in conjunction with a GPU. In general, the one or more processors 904 may be any technically feasible hardware unit capable of processing data and/or executing software applications. Further, in the context of this disclosure, the computing elements shown in computer system 900 may correspond to a physical computing system (e.g., a system in a data center) or may be a virtual computing instance.

Memory 906 includes a random-access memory (RAM) module, a flash memory unit, and/or any other type of memory unit or combination thereof. The one or more processors 904, and/or communications interface 914 are configured to read data from and write data to memory 906. Memory 906 includes various software programs that include one or more instructions that can be executed by the one or more processors 904 and application data associated with said software programs.

Storage 908 includes non-volatile storage for applications and data, and may include one or more fixed or removable disk drives, HDDs, SSD, NVMes, vDisks, flash memory devices, and/or other magnetic, optical, and/or solid-state storage devices.

Communications interface 914 includes hardware and/or software for coupling computer system 900 to one or more communication links 916. The one or more communication links 916 may include any technically feasible type of communications network that allows data to be exchanged between computer system 900 and external entities or devices, such as a web server or another networked computing system. For example, the one or more communication links 916 may include one or more wide area networks (WANs), one or more local area networks (LANs), one or more wireless (WiFi) networks, the Internet, and/or the like.

In sum, the disclosed techniques provide for increased flexibility and efficiency for storing replicas on various nodes in a cluster. The disclosed techniques maintain replicas across multiple nodes and store physical metadata for each replica in separate metadata stores, where the metadata store that includes the physical metadata for a particular replica is co-located with the replica. Therefore, each node independently determines how to store the replica (in uncompressed format or in various compressed formats) and updates the local metadata store to reflect the physical metadata accordingly. Further, each node independently processes the local metadata store to perform various background data management activities for the replicas stored on the particular node. As a result, decisions about how to store replicas and/or when to perform data management activities for those replicas are made locally by each node, resulting in greater flexibility and efficiency relative to a system with a single global metadata store.

At least one technical advantage of the disclosed techniques relative to the prior art is that, with the disclosed techniques, the cluster utilizes storage more efficiently while maintaining high performance. The techniques achieve savings in the storage by using data transformations, such as compression, without compromising on performance. Further, the techniques achieve improved support for configuration changes and updates for ongoing day-to-day operations of the cluster. This improved support is especially realized when working at very high scale (scale in terms of cluster size, storage capacity and workload performance). All of the background maintenance tasks that can be offloaded to a local scan further improve the efficiency of the bookkeeping that is needed to keep the cluster healthy and to reclaim and/or improve storage usage. In addition, the techniques enable and/or control parameters of how the different nodes are allowed to separately handle the encoding of the replicas. With the disclosed techniques, overall replica storage requirements for cold replicas are reduced, while maintaining high performance for hot replicas. The techniques distribute compression and data management functions among the nodes in a cluster to avoid the bottleneck of a centralized metadata store and data management function. These technical advantages provide one or more technological improvements over prior art approaches.

1. In some embodiments, one or more non-transitory computer readable media having stored thereon a sequence of instructions, when stored in memory and executed by one or more processors causes the one or more processors to perform steps for maintaining replicas of a data set, the steps comprising: storing, by a first node, a first replica of the data set on the first node; storing, by a second node, a second replica of the data set on the second node; and performing, by the first node and based on first metadata associated with the first replica, a first data management activity on the first replica that changes a first format of the first replica so that the first format of the first replica is different from a second format of the second replica.

2. The one or more non-transitory computer readable media according to clause 1, wherein the first metadata associated with the first replica resides on the first node and second metadata associated with the second replica resides on the second node.

3. The one or more non-transitory computer readable media according to clause 1 or clause 2, wherein the steps further comprise updating the first metadata associated with the first replica to reflect that the first replica is stored in the first format.

4. The one or more non-transitory computer readable media according to any of clauses 1-3, wherein the first format comprises a compressed format and the second format comprises an uncompressed format.

5. The one or more non-transitory computer readable media according to any of clauses 1-4, wherein the steps further comprise performing, by the second node, a second data management activity on the second replica based on second metadata associated with the second replica, wherein the second data management activity is independent from the first data management activity.

6. The one or more non-transitory computer readable media according to any of clauses 1-5, wherein the steps further comprise determining, by the first node, the first format of the first replica based on a data access pattern of the first replica.

7. The one or more non-transitory computer readable media according to any of clauses 1-6, wherein performing the first data management activity comprises updating the first metadata associated with the first replica to reflect a result of the first data management activity.

8. The one or more non-transitory computer readable media according to any of clauses 1-7, wherein the steps further comprise performing the first data management activity in response to determining that first format of the first replica is unsuitable for an actual data access pattern of the first replica.

9. The one or more non-transitory computer readable media according to any of clauses 1-8, wherein the first data management activity comprises one or more of changing a storage tier for the first replica, changing a compression level of the first replica, changing an encryption level of the first replica, or performing deduplication on the first replica.

10. The one or more non-transitory computer readable media according to any of clauses 1-9, wherein the steps further comprise determining, by the first node, that a trigger condition associated with one or more of an access time-based criteria, an event-based criteria, an input/output pattern-based criteria, or decision-based criteria occurs before performing the first data management activity.

11. The one or more non-transitory computer readable media according to any of clauses 1-10, wherein the first data management activity comprises moving the first replica from a first storage tier to a second storage tier based on at least one of a time of a last read access or a time of a last write access.

12. The one or more non-transitory computer readable media according to any of clauses 1-11, wherein the first data management activity comprises changing a compression format of the first replica based on at least one of a time of a last read access or a time of a last write access.

13. In some embodiments, a method for maintaining replicas of a data set comprises: storing, by a first node, a first replica of the data set on the first node; storing, by a second node, a second replica of the data set on the second node; and performing, by the first node and based on first metadata associated with the first replica, a first data management activity on the first replica that changes a first format of the first replica so that the first format of the first replica is different from a second format of the second replica.

14. The method according to clause 13, wherein the first metadata associated with the first replica resides on the first node and second metadata associated with the second replica resides on the second node.

15. The method according to clause 13 or clause 14, further comprising updating the first metadata associated with the first replica to reflect that the first replica is stored in the first format.

16. The method according to any of clauses 13-15, wherein the first format comprises a compressed format and the second format comprises an uncompressed format.

17. The method according to any of clauses 13-16, further comprising performing, by the second node, a second data management activity on the second replica based on second metadata associated with the second replica, wherein the second data management activity is independent from the first data management activity.

18. The method according to any of clauses 13-17, further comprising determining, by the first node, the first format of the first replica based on a data access pattern of the first replica.

19. The method according to any of clauses 13-18, wherein performing the first data management activity comprises updating the first metadata associated with the first replica to reflect a result of the first data management activity.

20. The method according to any of clauses 13-19, further comprising performing the first data management activity in response to determining that first format of the first replica is unsuitable for an actual data access pattern of the first replica.

21. The method according to any of clauses 13-20, wherein the first data management activity comprises one or more of changing a storage tier for the first replica, changing a compression level of the first replica, changing an encryption level of the first replica, or performing deduplication on the first replica.

22. The method according to any of clauses 13-21, further comprising determining, by the first node, that a trigger condition associated with one or more of an access time-based criteria, an event-based criteria, an input/output pattern-based criteria, or decision-based criteria occurs before performing the first data management activity.

23. The method according to any of clauses 13-22, wherein the first data management activity comprises one or more of moving the first replica from a first storage tier to a second storage tier or changing based on at least one of a time of a last read access or a time of a last write access or changing a compression format of the first replica based on at least one of a time of a last read access or a time of a last write access.

24. In some embodiments, a system, comprises: a first node comprising first memory storing first instructions and one or more first processors that are coupled to the first memory and configured to execute the first instructions; and a second node comprising second memory storing second instructions and one or more second processors that are coupled to the second memory and configured to execute the second instructions; wherein when executing the second instructions, the one or more second processors are configured to store a second replica of a data set on the second node; and wherein when executing the first instructions, the one or more first processors are configured to: store a first replica of the data set on the first node; and perform, based on first metadata associated with the first replica, a first data management activity on the first replica that changes a first format of the first replica so that the first format of the first replica is different from a second format of the second replica.

25. The system according to clause 24, wherein the first metadata associated with the first replica resides on the first node and second metadata associated with the second replica resides on the second node.

26. The system according to clause 24 or clause 25, wherein when executing the first instructions, the one or more first processors are further configured to update the first metadata associated with the first replica to reflect that the first replica is stored in the first format.

27. The system according to any of clauses 24-26, wherein the first format comprises a compressed format and the second format comprises an uncompressed format.

28. The system according to any of clauses 24-27, wherein when executing the second instructions, the one or more second processors are further configured to perform a second data management activity on the second replica based on second metadata associated with the second replica, wherein the second data management activity is independent from the first data management activity.

29. The system according to any of clauses 24-28, wherein when executing the first instructions, the one or more first processors are further configured to determine the first format of the first replica based on a data access pattern of the first replica.

30. The system according to any of clauses 24-29, wherein to perform the first data management activity, the one or more first processors are further configured to update the first metadata associated with the first replica to reflect a result of the first data management activity.

31. The system according to any of clauses 24-30, wherein when executing the first instructions, the one or more first processors are further configured to perform the first data management activity in response to determining that first format of the first replica is unsuitable for an actual data access pattern of the first replica.

32. The system according to any of clauses 24-31, wherein the first data management activity comprises one or more of changing a storage tier for the first replica, changing a compression level of the first replica, changing an encryption level of the first replica, or performing deduplication on the first replica.

33. The system according to any of clauses 24-32, wherein when executing the first instructions, the one or more first processors are further configured to determine that a trigger condition associated with one or more of an access time-based criteria, an event-based criteria, an input/output pattern-based criteria, or decision-based criteria occurs before performing the first data management activity.

34. The system according to any of clauses 24-33, wherein the first data management activity comprises one or more of moving the first replica from a first storage tier to a second storage tier or changing based on at least one of a time of a last read access or a time of a last write access or changing a compression format of the first replica based on at least one of a time of a last read access or a time of a last write access.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. One or more non-transitory computer readable media having stored thereon a sequence of instructions which, when stored in memory and executed by one or more processors causes the one or more processors to perform steps for maintaining replicas of a data set, the steps comprising:
   storing, by a first node, a first replica of the data set in persistent storage on the first node;
   storing, by a second node different than the first node, a second replica of the data set in persistent on the second node; and
   performing, by the first node and based on first metadata associated with the first replica, a first data management activity on the first replica that changes a first format of the first replica so that the first format of the first replica is different from a second format of the second replica.

2. The one or more non-transitory computer readable media of claim 1, wherein the first metadata associated with the first replica resides on the first node and second metadata associated with the second replica resides on the second node.

3. The one or more non-transitory computer readable media of claim 1, wherein the steps further comprise updating the first metadata associated with the first replica to reflect that the first replica is stored in the first format.

4. The one or more non-transitory computer readable media of claim 1, wherein the first format comprises a compressed format and the second format comprises an uncompressed format.

5. The one or more non-transitory computer readable media of claim 1, wherein the steps further comprise performing, by the second node, a second data management activity on the second replica based on second metadata associated with the second replica, wherein the second data management activity is independent from the first data management activity.

6. The one or more non-transitory computer readable media of claim 1, wherein the steps further comprise determining, by the first node, the first format of the first replica based on a data access pattern of the first replica.

7. The one or more non-transitory computer readable media of claim 1, wherein performing the first data management activity comprises updating the first metadata associated with the first replica to reflect a result of the first data management activity.

8. The one or more non-transitory computer readable media of claim 1, wherein the steps further comprise performing the first data management activity in response to determining that the first format of the first replica is unsuitable for an actual data access pattern of the first replica.

9. The one or more non-transitory computer readable media of claim 1, wherein the first data management activity comprises one or more of changing a storage tier for the first replica, changing a compression level of the first replica, changing an encryption level of the first replica, or performing deduplication on the first replica.

10. The one or more non-transitory computer readable media of claim 1, wherein the steps further comprise determining, by the first node, that a trigger condition associated with one or more of an access time-based criteria, an event-based criteria, an input/output pattern-based criteria, or a decision-based criteria occurs before performing the first data management activity.

11. The one or more non-transitory computer readable media of claim 1, wherein the first data management activity comprises moving the first replica from a first storage tier to a second storage tier based on at least one of a time of a last read access or a time of a last write access.

12. The one or more non-transitory computer readable media of claim 1, wherein the first data management activity comprises changing a compression format of the first replica based on at least one of a time of a last read access or a time of a last write access.

13. A method for maintaining replicas of a data set, the method comprising:
storing, by a first node, a first replica of the data set in persistent storage on the first node;
storing, by a second node different than the first node, a second replica of the data set in persistent storage on the second node; and
performing, by the first node and based on first metadata associated with the first replica, a first data management activity on the first replica that changes a first format of the first replica so that the first format of the first replica is different from a second format of the second replica.

14. The method of claim 13, wherein the first metadata associated with the first replica resides on the first node and second metadata associated with the second replica resides on the second node.

15. The method of claim 13, further comprising updating the first metadata associated with the first replica to reflect that the first replica is stored in the first format.

16. The method of claim 13, wherein the first format comprises a compressed format and the second format comprises an uncompressed format.

17. The method of claim 13, further comprising performing, by the second node, a second data management activity on the second replica based on second metadata associated with the second replica, wherein the second data management activity is independent from the first data management activity.

18. The method of claim 13, further comprising determining, by the first node, the first format of the first replica based on a data access pattern of the first replica.

19. The method of claim 13, wherein performing the first data management activity comprises updating the first metadata associated with the first replica to reflect a result of the first data management activity.

20. The method of claim 13, further comprising performing the first data management activity in response to determining that the first format of the first replica is unsuitable for an actual data access pattern of the first replica.

21. The method of claim 13, wherein the first data management activity comprises one or more of changing a storage tier for the first replica, changing a compression level of the first replica, changing an encryption level of the first replica, or performing deduplication on the first replica.

22. The method of claim 13, further comprising determining, by the first node, that a trigger condition associated with one or more of an access time-based criteria, an event-based criteria, an input/output pattern-based criteria, or decision-based criteria occurs before performing the first data management activity.

23. The method of claim 13, wherein the first data management activity comprises one or more of moving the first replica from a first storage tier to a second storage tier or changing based on at least one of a time of a last read access or a time of a last write access or changing a compression format of the first replica based on at least one of a time of a last read access or a time of a last write access.

24. A system, comprising:
a first node comprising first memory storing first instructions and one or more first processors that are coupled to the first memory and configured to execute the first instructions; and
a second node different than the first node comprising second memory storing second instructions and one or more second processors that are coupled to the second memory and configured to execute the second instructions;

wherein when executing the second instructions, the one or more second processors are configured to store a second replica of a data set in persistent storage on the second node; and wherein when executing the first instructions, the one or more first processors are configured to:

store a first replica of the data set in persistent storage on the first node; and perform, based on first metadata associated with the first replica, a first data management activity on the first replica that changes a first format of the first replica so that the first format of the first replica is different from a second format of the second replica.

25. The system of claim 24, wherein the first metadata associated with the first replica resides on the first node and second metadata associated with the second replica resides on the second node.

26. The system of claim 24, wherein when executing the first instructions, the one or more first processors are further configured to update the first metadata associated with the first replica to reflect that the first replica is stored in the first format.

27. The system of claim 24, wherein the first format comprises a compressed format and the second format comprises an uncompressed format.

28. The system of claim 24, wherein when executing the second instructions, the one or more second processors are further configured to perform a second data management activity on the second replica based on second metadata associated with the second replica, wherein the second data management activity is independent from the first data management activity.

29. The system of claim 24, wherein when executing the first instructions, the one or more first processors are further configured to determine the first format of the first replica based on a data access pattern of the first replica.

30. The system of claim 24, wherein to perform the first data management activity, the one or more first processors are further configured to update the first metadata associated with the first replica to reflect a result of the first data management activity.

31. The system of claim 24, wherein when executing the first instructions, the one or more first processors are further configured to perform the first data management activity in response to determining that the first format of the first replica is unsuitable for an actual data access pattern of the first replica.

32. The system of claim 24, wherein the first data management activity comprises one or more of changing a storage tier for the first replica, changing a compression level of the first replica, changing an encryption level of the first replica, or performing deduplication on the first replica.

33. The system of claim 24, wherein when executing the first instructions, the one or more first processors are further configured to determine that a trigger condition associated with one or more of an access time-based criteria, an event-based criteria, an input/output pattern-based criteria, or a decision-based criteria occurs before performing the first data management activity.

34. The system of claim 24, wherein the first data management activity comprises one or more of moving the first replica from a first storage tier to a second storage tier or changing based on at least one of a time of a last read access or a time of a last write access or changing a compression format of the first replica based on at least one of a time of a last read access or a time of a last write access.

* * * * *

UNITED STATES PATENT AND TRADEMARK OFFICE
CERTIFICATE OF CORRECTION

PATENT NO. : 11,960,452 B2
APPLICATION NO. : 17/514734
DATED : April 16, 2024
INVENTOR(S) : Tabrez Parvez Memon et al.

Page 1 of 1

It is certified that error appears in the above-identified patent and that said Letters Patent is hereby corrected as shown below:

In the Claims

Column 32, Claim 1, Line 64, please insert --storage-- after persistent;

Column 34, Claim 22, Line 48, please insert --a-- after or.

Signed and Sealed this
Twenty-second Day of October, 2024

Katherine Kelly Vidal
*Director of the United States Patent and Trademark Office*